(12) United States Patent
Dohno

(10) Patent No.: US 10,642,487 B2
(45) Date of Patent: May 5, 2020

(54) NON-TRANSITORY MEMORY MEDIUM STORING INFORMATION PROCESSING PROGRAM, AND INFORMATION PROCESSING APPARATUS

(71) Applicant: ALVION Inc., Osaka (JP)

(72) Inventor: Kuninori Dohno, Osaka (JP)

(73) Assignee: ALVION Inc., Osaka (JP)

( * ) Notice: Subject to any disclaimer, the term of this patent is extended or adjusted under 35 U.S.C. 154(b) by 0 days.

(21) Appl. No.: 15/974,162

(22) Filed: May 8, 2018

(65) Prior Publication Data

US 2019/0129612 A1 May 2, 2019

(30) Foreign Application Priority Data

May 11, 2017 (JP) ................................. 2017-095015

(51) Int. Cl.
| | |
|---|---|
| *G06F 3/0484* | (2013.01) |
| *G06F 3/0488* | (2013.01) |
| *A63F 13/2145* | (2014.01) |
| *A63F 13/426* | (2014.01) |
| *A63F 13/533* | (2014.01) |

(52) U.S. Cl.
CPC ...... *G06F 3/04886* (2013.01); *A63F 13/2145* (2014.09); *A63F 13/426* (2014.09); *A63F 13/533* (2014.09); *G06F 3/04845* (2013.01); *A63F 2300/308* (2013.01)

(58) Field of Classification Search
CPC .. G06F 3/0484; G06F 3/04886; G06F 3/0488; A63F 13/2145
See application file for complete search history.

(56) References Cited

U.S. PATENT DOCUMENTS

2014/0066195 A1   3/2014  Matsui et al.

FOREIGN PATENT DOCUMENTS

| JP | 4420730 | 2/2010 |
|---|---|---|
| JP | 5876600 | 3/2016 |
| JP | 2016126512 A | 7/2016 |
| JP | 2016206740 A | 12/2016 |

OTHER PUBLICATIONS

European Search Report dated Sep. 24, 2018 for the corresponding EP Patent Application No. 18171761.2.

*Primary Examiner* — Andrea C Leggett
(74) *Attorney, Agent, or Firm* — Rankin, Hill & Clark LLP

(57) ABSTRACT

An aspect of the present invention is a non-transitory storage medium storing an information processing program causing a computer connected to or including a display apparatus including a manipulation input part accepting one of a contact manipulation and a proximity manipulation to function as: virtual controller attribute changing module for changing an attribute of a virtual controller image according to a manipulation of a user performed on the manipulation input part; and display image generating module for generating the virtual controller image based on a power attribute and a directional attribute of the virtual controller image changed by the virtual controller attribute changing module, and generating a manipulation target image to be displayed on the display apparatus such that the manipulation target shift linked to the power attribute module and the directional attribute of the virtual controller image.

20 Claims, 26 Drawing Sheets

FIG. 3

| | | | |
|---|---|---|---|
| PRECONDITION SETTING INFORMATION | MANIPULATION POWER INFORMATION OBTAINED WHEN THE PROGRAM ENDS LAST | | |
| | DISPLAY POSITION INFORMATION OBTAINED WHEN THE PROGRAM ENDS LAST | | |
| | FUNCTIONAL STATE DISPLAY PART ATTRIBUTE OBTAINED WHEN THE PROGRAM ENDS LAST | | |
| | HORIZONTAL/DIRECTIONAL DISPLAY PART ATTRIBUTE OBTAINED WHEN THE PROGRAM ENDS LAST | | |
| | MANIPULATION TARGET ATTRIBUTE OBTAINED WHEN THE PROGRAM ENDS LAST | | |
| | VIEWPOINT ATTRIBUTE OBTAINED WHEN THE PROGRAM ENDS LAST | | |
| MANIPULATION POWER INFORMATION | DEFINE RELATIONSHIP BETWEEN FINGER'S TRAVELING DISTANCE AND CHANGE RATE OF POWER | | |
| DISPLAY POSITION INFORMATION | DEFINE DISPLAY POSITION OF VIRTUAL CONTROLLER IMAGE | DISPLAY ABOVE MANIPULATION TARGET | |
| | | DISPLAY IN CLOSE PROXIMITY TO TOUCH POSITION | |
| | | DISPLAY AT FIXED POSITION | |
| FUNCTIONAL STATE DISPLAY PART ATTRIBUTE | MANIPULATION MODE ATTRIBUTE | NORMAL MODE | |
| | | AUTOMATIC SHIFT MODE | |
| | | AUTOMATIC ATTACK MODE | |
| | | SEARCH MODE | |
| | | SELECT MODE | |
| | | MANIPULATION TARGET SELECT MODE | |
| | POWER ATTRIBUTE | DEFINE POWER INDICATED BY FUNCTIONAL STATE DISPLAY PART | |
| HORIZONTAL/ DIRECTIONAL DISPLAY PART ATTRIBUTE | HORIZONTAL ATTRIBUTE | DEFINE POSITIONAL RELATIONSHIP RELATIVE TO HORIZONTAL PLANE | |
| | DIRECTIONAL ATTRIBUTE | DEFINE DIRECTION INDICATED BY HORIZONTAL/DIRECTIONAL DISPLAY PART | |
| MANIPULATION TARGET ATTRIBUTE | POSITION INFORMATION | DEFINE POSITION OF MANIPULATION TARGET | |
| | SPEED INFORMATION | DEFINE SHIFT SPEED OF MANIPULATION TARGET | |
| | DIRECTION INFORMATION | DEFINE SHIFT DIRECTION OF MANIPULATION TARGET | |
| | TARGET INFORMATION | DEFINE WHICH OBJECT IS MANIPULATION TARGET | |
| VIEWPOINT ATTRIBUTE | DEFINE POSITION OF VIEWPOINT CAMERA | | |

SHIFT DIRECTION OF CONTACT POSITION
(IN RIGHT DIRECTION)

SHIFT DIRECTION OF CONTACT POSITION
(IN LEFT DIRECTION)

SHIFT DIRECTION OF CONTACT POSITION
(IN UPPER RIGHT DIRECTION)

SHIFT DIRECTION OF CONTACT POSITION
(IN LOWER LEFT DIRECTION)

CONTACT

WHILE BEING IN CONTACT,
METER VALUE IS FIXED
→ MANIPULATION TARGET SHIFTS

DRAG

DIRECTION INDICATION CHANGES
WITH METER VALUE BEING FIXED
→ MANIPULATION TARGET SHIFTS
IN INDICATED DIRECTION

METER VALUE INCREASES
→ SHIFT SPEED INCREASES

METER VALUE INCREASES
→ SHIFT SPEED INCREASES

FIG. 19A
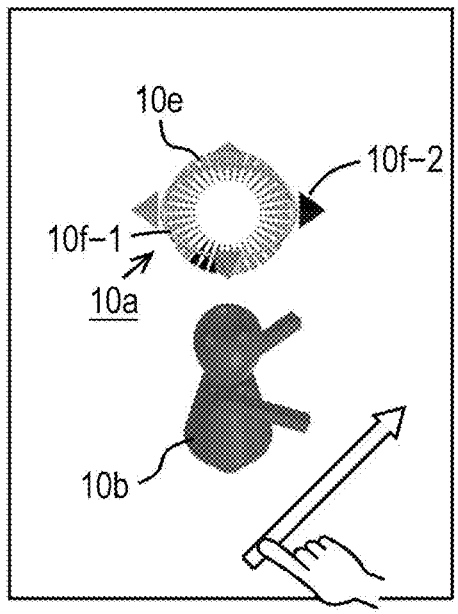
SWIPE UPPER RIGHTWARD
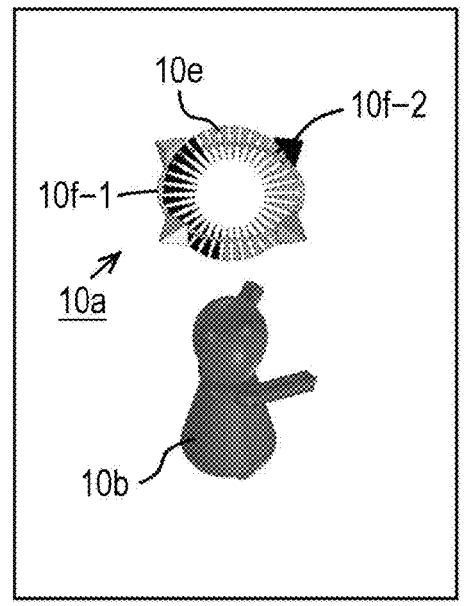
- INDICATED DIRECTION CHANGES
  → MANIPULATION TARGET SHIFTS IN THE INDICATED DIRECTION
- METER VALUE INCREASES
  → MANIPULATION TARGET SHIFTS ACCORDING TO METER VALUE
FIG. 19B
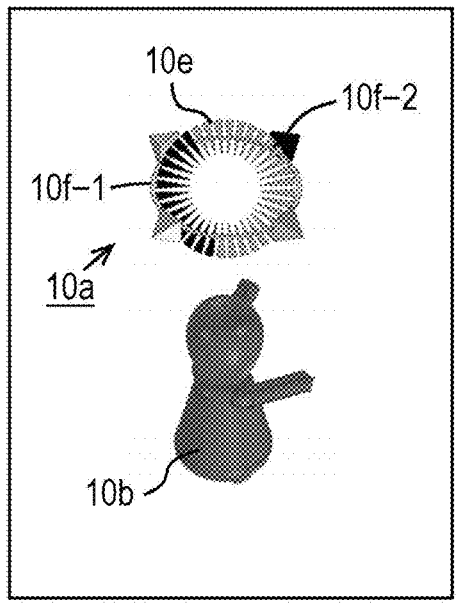
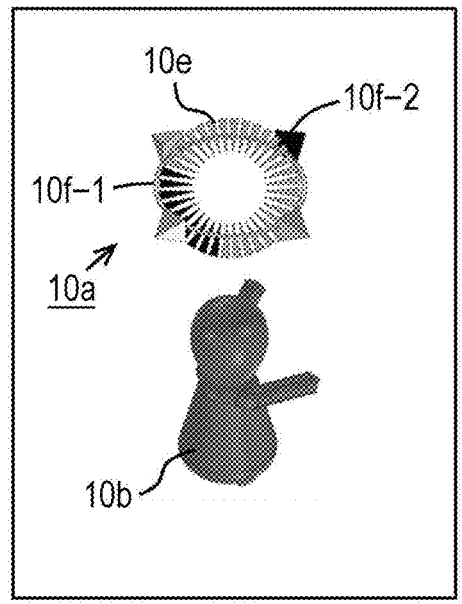
METER VALUE REDUCES
→ MANIPULATION TARGET DECELERATES

EXPRESS PRESS-DOWN FEELING

FIG. 24A
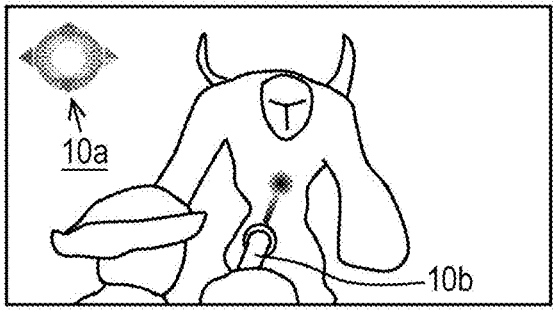
FIG. 24E
FIG. 24B ⇩ SWITCH TO SEARCH MODE
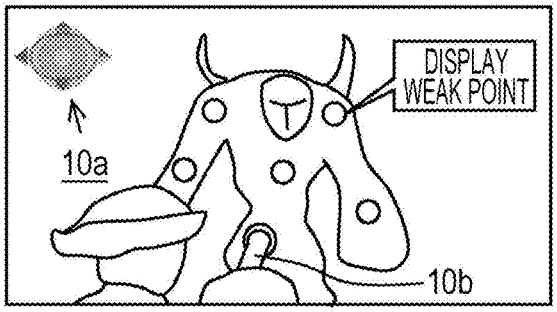
FIG. 24C ⇩ SWITCH TO SELECT MODE
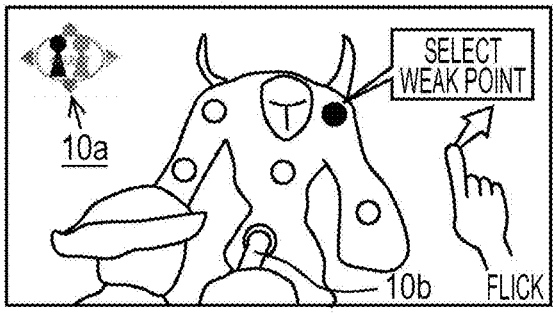
FIG. 24D ⇩ SWITCH TO NORMAL MODE
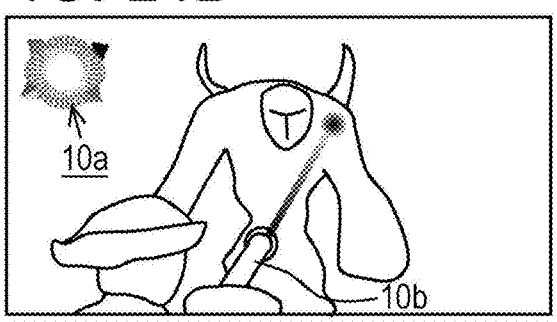

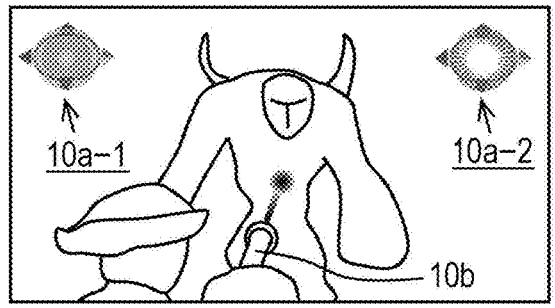
FIG. 27A
⇩ SWITCH LEFT FINGER TO SEARCH MODE
SWITCH RIGHT FINGER TO NORMAL MODE
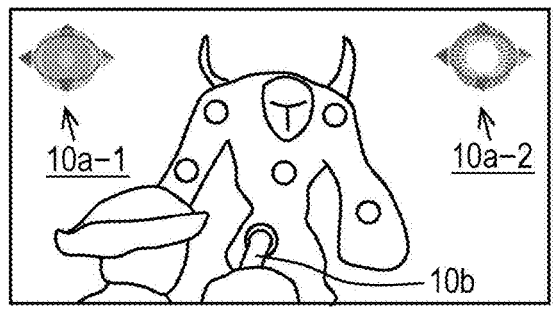
FIG. 27B — SEARCH FOR WEAK POINT WHILE AVOIDING ATTACK
⇩ SWITCH LEFT FINGER TO SELECT MODE
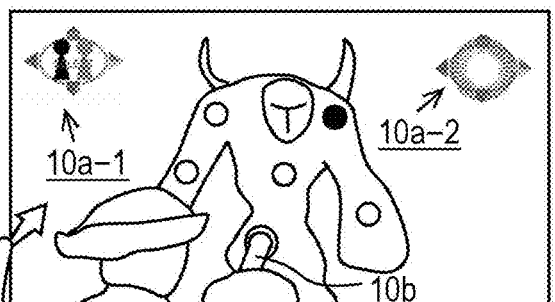
FIG. 27C — SELECT WEAK POINT WHILE AVOIDING ATTACK
⇩ SWITCH RIGHT FINGER TO AUTOMATIC ATTACK MODE
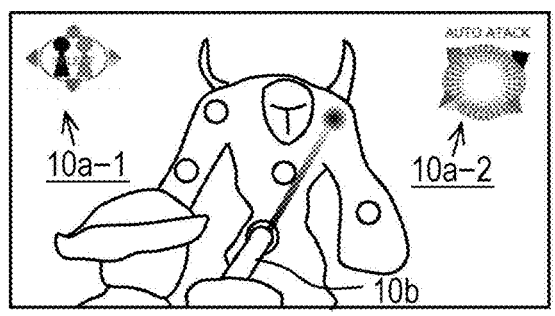
FIG. 27D — ATTACK WEAK POINT

NON-TRANSITORY MEMORY MEDIUM STORING INFORMATION PROCESSING PROGRAM, AND INFORMATION PROCESSING APPARATUS

BACKGROUND

1. Technical Field

The present invention relates to a non-transitory storage medium storing an information processing program executed on a computer connected to or including a display apparatus including a manipulation input part and an information processing apparatus. More specifically, the present invention relates to a non-transitory storage medium storing an information processing program for manipulating a manipulation target image on a screen using a virtual controller and an information processing apparatus.

2. Description of the Related Art

A touch panel is used in a smartphone, a tablet terminal, a notebook computer, a display apparatus and the like. For example, when the user plays an application executing a program with a smartphone or a tablet terminal each equipped with a touch panel, the user can control the shift speed and the shift direction of a manipulation target by manipulating the touch panel with a finger or a stylus. Applications played on a touch panel require intuitive manipulations. Accordingly, there have been typically proposed inventions such as those disclosed in Japan Patent Nos. 4420730 and 5876600 as exemplary game-related inventions.

A program disclosed in Japan Patent No. 4420730 allows the user to easily visually recognize the shift direction and the shift speed of a character in virtual space by: detecting a slide manipulation on an input manipulation region; controlling the shift of the character being the manipulation target based on the detected slide manipulation; and displaying a rotating virtual trackball representing the shift direction and the shift speed of the character and indicating the rotation direction by an arrow. Thus, the user can perform a slide manipulation with reference to the recognized shift direction or shift speed. Accordingly, the operability of the character can be improved.

In a program disclosed in Japan Patent No. 5876600, a rotary controller rotates in the user's swipe direction. Then, in virtual space, a character being the manipulation target shifts in the swipe direction as being linked to the rotary controller (see paragraph 0026 in Japan Patent No, 5876600). Thus, a virtual controller in a 3D game is realized.

As disclosed in Japan Patent Nos. 4420730 and 5876600, typically, there have been existed game programs in which the shift direction and the shift speed of a character being the manipulation target are expressed using a rotating virtual trackball or a rotary controller.

However, in the game program disclosed in Japan Patent No. 4420730, the character merely shifts by a user's slide manipulation. The virtual trackball merely displays the shift direction and the shift speed of the character.

In other words, processes in the program disclosed in Japan Patent No. 4420730 are performed in order of: "recognizing a slide manipulation", to "shifting the character", and to "rotating the virtual trackball". The virtual trackball merely expresses the shift direction and the shift speed of the character (see paragraph 0074 in Japan Patent No. 4420730). That is, in the program disclosed in Japan Patent No. 4420730, the character does not shift as being linked to the movement of the virtual trackball.

In Japan Patent No. 4420730, what is directly linked to a slide manipulation is the shift of the character. Therefore, despite the user trying to manipulate the character while rotating the virtual trackball with the desired direction and speed, the user would feel that the character could hardly move as desired. In Japan Patent No, 4420730, while a virtual trackball is used, the virtual trackball merely serves as an index indicative of the shift direction and the shift speed of the character. As a result, what the user has is just the feeling of shifting the character directly by a slide manipulation. In other words, the user cannot have the impression that the user is controlling the shift of the character by manipulating the virtual trackball. On the contrary, due to the existence of the virtual trackball, the user would be given the impression that the user is incapable of manipulating the manipulation target as desired. Hence, the virtual trackball disclosed in Japan Patent No. 4420730 fails to fully serve as a virtual controller.

In the program disclosed in Japan Patent No. 5876600, the rotary controller is caused to rotate in the user's swipe direction, so that the character shifts in the virtual space as being linked to the rotary controller. Thus, as compared to the program of Japan Patent No. 4420730, the user would be given the impression that the character is shifting by the feeling of manipulating the rotary controller.

However, in the program disclosed in Japan Patent No. 5876600, it is just recited that the rotation direction, the rotation amount, the rotation speed or the like of the rotary controller and the shifting of the character are linked to each other (see S7 in FIG. 4 and others in Japan Patent No. 5876600). How specifically the link works is unclear. Further, Japan Patent No. 5876600 only assumes the link to a swipe operation. Japan Patent No. 5876600 is totally silent about how the rotary controller and the shift of the character are linked to each other when any manipulation other than a swipe is performed. Further, in the program disclosed in Japan Patent No. 5876600, the rotation direction and the rotation speed of the rotary controller represent the shift direction and the shift speed of the character. However, the rotation direction and the rotation speed of the rotary controller shown in FIGS. 2 and 5 of Japan Patent No. 5876600 are hardly intuitively understood. Hence, the rotary controller disclosed in Japan Patent No. 5876600 also fails to fully function as a virtual controller.

As described above, typically, as a virtual controller, Japan Patent Nos. 4420730 and 5876600 each propose the controller. However, provided that the virtual trackball of Japan Patent No. 4420730 and the rotary controller of Japan Patent No. 5876600 are actually used, a character cannot be accurately manipulated.

Further, such typical virtual controllers are not used just for a game program. These controllers are also applicable to a manipulation on any manipulation target on a screen. However, applying the typical virtual controllers to any application other than a game still fails to accurately manipulate a manipulation target.

SUMMARY

Accordingly, an object of the present invention is to provide a non-transitory storage medium storing a program capable of realizing, on a computer, a virtual controller with which a manipulation target can be accurately manipulated and an information processing apparatus.

In order to solve the above-described problem, the present invention has the following characteristics. An aspect of the present invention is a non-transitory storage medium storing a computer-readable information processing program executed by a computer connected to or including a display apparatus including a manipulation input part accepting one of a contact manipulation or a proximity manipulation. The non-transitory storage medium causes the computer executing the information processing program to function as virtual controller attribute changing module and display image generating module.

The virtual controller attribute changing module changes an attribute of a virtual controller image according to a manipulation of a user performed on the manipulation input part. Further, the display image generating module generates, based on the attribute of the virtual controller image changed by the virtual controller attribute changing module, the virtual controller image. Also, the display image generating module generates an image of a manipulation target to be displayed on the display apparatus such that the manipulation target shifts linked to the attribute of the virtual controller image.

The virtual controller image may include at least one of a first image indicating power and a second image indicating a direction.

The first image may represent a shift speed of the manipulation target, and the second image may represent a shift direction of the manipulation target.

The virtual controller image may include a third image indicating a manipulation mode.

The virtual controller image may include a fourth image indicating a reference plane.

The virtual controller image may include a fifth image indicating a height.

The virtual controller image may include a sixth image indicating an elevation/depression angle.

The virtual controller image may include a seventh image indicating a state of the manipulation target.

When a manipulation is performed by the user on the manipulation input part, the virtual controller attribute changing module may change an attribute relating to the direction in the virtual controller image based on a direction of the manipulation performed by the user.

While a drag is performed as the manipulation performed by the user on the manipulation input part, the virtual controller attribute changing module changes the attribute relating to the direction in the virtual controller image according to a movement of the drag.

When a manipulation is performed by the user on the manipulation input part, the virtual controller attribute changing module may change an attribute relating to the power in the virtual controller image based on a distance traveled by the user's manipulation.

When a swipe is performed as the manipulation performed by the user on the manipulation input pan, the virtual controller attribute changing module may change the attribute relating to the power in the virtual controller image based on the distance traveled by the swipe.

When a flick is performed as the manipulation performed by the user on the manipulation input part, the virtual controller attribute changing module may change the attribute relating to the power in the virtual controller image based on the flick.

When a tap is performed as the manipulation performed by the user on the manipulation input part, the manipulation target may perform a predetermined operation.

When a tap is performed as the manipulation performed by the user on the manipulation input part, the virtual controller attribute changing module may change the attribute relating to the power in the virtual controller image to stop the manipulation target.

When an instruction to change a viewpoint is issued by the manipulation performed by the user on the manipulation input part, the display image generating module may generate an image in which the viewpoint is changed.

When an instruction to change the manipulation mode is issued by the manipulation performed by the user on the manipulation input part, the display image generating module may generate an image indicating the changed manipulation mode.

When the manipulation performed by the user on the manipulation input part detects an instruction to pick up and shift the manipulation target, the display image generating module may shift the manipulation target.

During an absence of the manipulation performed by the user on the manipulation input part, the virtual controller attribute changing module may automatically change the attribute relating to the power of the virtual controller image according to a predetermined rule.

When a mode of searching for a target is specified as the manipulation mode, the display image generating module may generate an image displaying the target.

When a mode of selecting a target is specified as the manipulation mode, the display image generating module may generate an image of selecting the target based on the manipulation of the user on the manipulation input part.

While the user is performing one of the contact manipulation and the proximity manipulation with the manipulation input part, the virtual controller attribute changing module may fix the attribute relating to the power in the virtual controller image.

When a mode in which the manipulation target automatically shifts is specified as the manipulation mode, the virtual controller attribute changing module may automatically change the attribute of the virtual controller image according to a predetermined rule.

For each frame for displaying an image on the display apparatus, the display image generating module may generate the virtual controller image and an image of the manipulation target with reference to the attribute of the virtual controller image generated by the virtual controller attribute changing module.

The computer may be controlled so that a change rate of the attribute relating to the power of the virtual controller image for the manipulation performed by the user on the manipulation input part is adjustable.

When an instruction to change an altitude of the manipulation target is issued by the manipulation performed by the user on the manipulation input part, the display image generating module may generate an image in which the altitude of the manipulation target is changed.

When an instruction to change an elevation/depression angle of the manipulation target is issued by the manipulation performed by the user on the manipulation input part, the display image generating module may generate an image in which the elevation/depression angle of the manipulation target is changed.

A manipulation detecting part may be divided into at least two regions, and attributes of the virtual controller image may be allotted respectively to the regions. Further, a virtual controller attribute changing part may change corresponding one of the attributes of the virtual controller image according to the manipulation performed by the user on one of the regions.

Other aspect of the present invention is an information processing apparatus connected to or including a display apparatus including a manipulation input part accepting one of a contact manipulation and a proximity manipulation.

The information processing apparatus is characterized in including; virtual controller attribute changing module for changing an attribute of a virtual controller image according to a manipulation of a user performed on the manipulation input part; and display image generating module for generating the virtual controller image based on the attribute of the virtual controller image changed by the virtual controller attribute changing module, and generating an image of a manipulation target to be displayed on the display apparatus such that the manipulation target shifts linked to the attribute of the virtual controller image.

Effect of the Invention

The present invention makes it possible to change the attribute of the virtual controller image according to a manipulation of the user. Therefore, based on the attribute of the virtual controller image, the virtual controller image is displayed. Accordingly, the manipulation of the user and the virtual controller image are linked to each other. Therefore, the user can be given the impression that the user is manipulating the virtual controller image. Then, the image of the manipulation target to be displayed on the display apparatus is generated so that the manipulation target shifts as being linked to the attribute of the virtual controller image. Therefore, the user can be given the impression that the manipulation target is shifting accurately according to the manipulation represented by the virtual controller image that the user is manipulating. As a result, there is provided a non-transitory storage medium capable of realizing, on a computer, a virtual controller with which a manipulation target can be accurately controlled as compared to the typical technique.

Using the first image indicating power as the virtual controller image, the user can manipulate the virtual controller image while recognizing the power, such as the shift speed, the strength, the weight, and the size, of the manipulation target. Therefore, an ever-more accurate manipulation is realized.

Using the second image indicating a direction as the virtual controller image, the user can manipulate the virtual controller image while recognizing the direction, such as the shift direction, the attack direction, and the defense direction, of the manipulation target. Therefore, an ever-more accurate manipulation is realized Representatively, by the first image being an image representing the shift speed of the manipulation target, and the second image being an image representing the shift direction of the manipulation target, the program of the present invention can be used as a virtual controller in virtual space.

By the virtual controller image including a third image indicating a manipulation mode, any manipulation environment suitable for the manipulation mode can be provided to the user.

By the virtual controller image including a fourth image indicating the reference plane such as a horizontal plane, the ground, the atmosphere, the cloud, or the boundary plane relative to the photic zone, the user can recognize the positional relationship between the reference plane and the manipulation target.

By the virtual controller image including a fifth image indicating a height, the user can recognize the height of the manipulation target.

By the virtual controller image including a sixth image indicating an elevation/depression angle, the user can recognize the elevation/depression angle or the manipulation target.

By the virtual controller image including a seventh image indicating the state of the manipulation target, the user can recognize the state of the manipulation target.

By the virtual controller attribute changing module changing the attribute relating to the direction in the virtual controller image based on the direction of a manipulation performed by the user, the manipulation target can be shifted according to the manipulation direction.

By changing the attribute relating to the direction in the virtual controller image according to the movement of a drag, the manipulation target can be shifted while finely adjusting the shift direction of the manipulation target. Therefore, the manipulation target can be shifted accurately.

By changing the attribute relating to the power in the virtual controller image based on the distance traveled by a user's manipulation, the power such as the speed of the manipulation target can be changed according to the distance traveled by the manipulation.

By changing the attribute relating to the power in the virtual controller image based on the distance traveled by a swipe, the power such as the speed of the manipulation target can be changed according to the swipe distance. That is, the power such as the speed of the manipulation target can be finely adjusted.

By changing the attribute relating to the power in the virtual controller image based on a flick, the power such as the speed of the manipulation target can be increased or reduced according to the count and speed of the flick and other information on the flick. Therefore, the power such as the speed of the manipulation target can be finely adjusted.

Performing a tap can cause the manipulation target to perform a predetermined operation. As used herein, the predetermined operation is, for example, an action such as stop, attack, defense, transform, jump, rotate, warp, and duplicate, or a predetermined operation such as deceleration or sudden deceleration. However, the predetermined operation is not particularly limited to those operations.

By changing the attribute relating to the power in the virtual controller image so that the manipulation target stops when a tap is performed, the manipulation target can be stopped.

By the display image generating module generating an image in which the viewpoint is changed when an instruction to change the viewpoint is issued, the image with the changed viewpoint can be displayed.

By the display image generating module generating an image indicating the changed manipulation mode when an instruction to change the manipulation mode is issued, the user can recognize the manipulation mode.

By the display image generating module shifting the manipulation target when an instruction to pick up and shift the manipulation target is issued, the user can recognize the shifting manipulation target.

By the virtual controller attribute changing module automatically changing the attribute relating to the power of the virtual controller image according to a predetermined rule during an absence of the manipulation performed by the user on the manipulation input part, the manipulation target can be automatically decelerated or accelerated. Further, by combining with the fixing the power attribute which will be described later, the manipulation target can be manipulated with the desired power.

By the display image generating module generating an image displaying a target when a mode of searching for a target is specified, the user can recognize the target searched for.

By the virtual controller attribute changing module fixing the attribute relating to the power in the virtual controller image while the user is performing one of a contact manipulation and a proximity manipulation, for example, the manipulation target can be shifted at a constant speed. Therefore, the manipulation target can be shifted at the desired power.

By the attribute of the virtual controller age automatically changing when a mode of automatically shifting the manipulation target is specified, the manipulation target can be displayed as shifting automatically.

By the virtual controller image and the image of the manipulation target being generated with reference to the attribute of the virtual controller image for each frame, the user is given the impression that the virtual controller image and the manipulation target are seamlessly linked to each other. Therefore, natural and highly accurate control of the manipulation target is realized.

By the change rate of the power attribute being adjustable, the natural manipulation feeling corresponding to the size of the display apparatus can be realized. Further, the manipulation feeling suiting the user's preference is realized.

By the display image generating module generating an image in which the altitude of the manipulation target is changed when an instruction to change the altitude of the manipulation target is issued, the change in the altitude of the manipulation target can be displayed.

The manipulation detecting part is divided into at least two regions. Therefore, by allotting the attributes of the virtual controller image to the regions, for example, different manipulations can be respectively performed with a right finger and a left finger. Therefore, variations of manipulations increase.

These and other objects, characteristics, aspects and effects of the present invention will become more apparent from the following detailed description taken in conjunction with the accompanying drawings.

BRIEF DESCRIPTION OF THE DRAWINGS

FIG. 3 is a table of the contents of data to be used in the program of the present invention;

FIGS. 19A and 19B are a series of illustrations showing an exemplary display screen when a series of processes of changing the direction, changing the shift speed, and decelerating is performed by a swipe;

FIGS. 24A to 24E are a series of illustrations showing exemplary transition of the screen when the virtual controller of the present invention is used in a gun shooting game;

FIGS. 27A to 27D are series of illustrations showing an exemplary screen when two virtual controller images are used;

DESCRIPTION OF THE EMBODIMENTS

Figure 1:
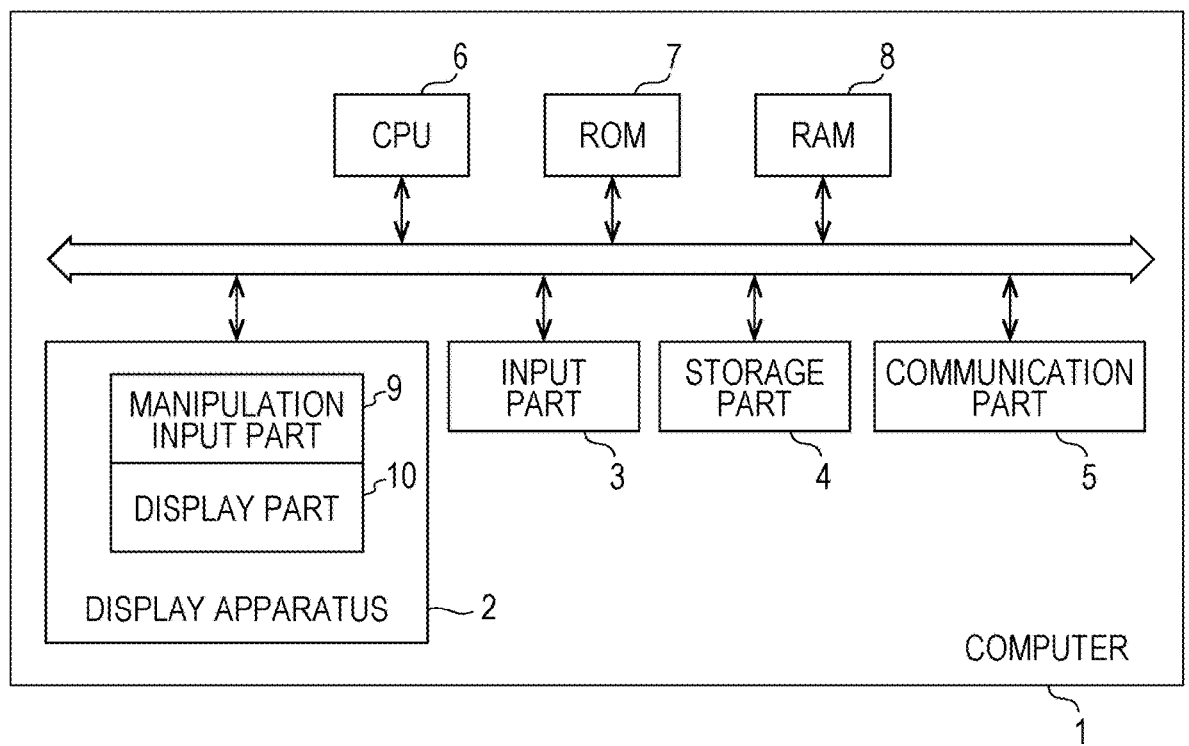
FIG. 1 is a block diagram showing the hardware configuration of a computer 1 that executes a program according to an embodiment of the present invention.

FIG. 1 is a block diagram showing the hardware configuration of a computer 1 that executes an information processing program (hereinafter referred to as "program") according an embodiment of the present invention. The computer 1 is, for example, an information processing apparatus such as a smartphone, a tablet terminal, a notebook computer, a personal computer, or a digital audio player. In FIG. 1, the computer 1 includes a display apparatus 2, an input part 3, a storage part 4, a communication part 5, a CPU (Central Processing Unit) 6, ROM (Read Only Memory) 7, and RAM (Random Access Memory) 8.

In the following description, the program that the computer 1 executes is a game program. However, the present invention is not limited to a game program. To any program in which the user manipulates an image being the manipulation target, the program of the present invention can be applied to the manipulation, without being limited to a game program. There exist no limitations on the genre and the category of a program to which the present invention is applied. For example, the present invention can be used as an application which allows a large number of people to simultaneously manipulate manipulation targets on a meeting table whose entire surface serves as a monitor. The genre and the category of the program are wide enough to include a program for displaying map information or traffic information, a program for displaying advertisement, a program for displaying a three-dimensional image, a program for viewing CAD data, and various kinds of simulation programs. Thus, the applicable range of the present invention is wide.

The display apparatus 2 is, for example, a touch panel, and includes a manipulation input part 9 and a display part 10. Similarly to a smartphone or a tablet terminal, the computer 1 may have the display apparatus 2 installed therein. Alternatively, the computer 1 may be a personal computer or the like capable of connecting to the display apparatus 2 via wired, wireless, or network communication part.

The manipulation input part 9 is an apparatus capable of sensing a contact manipulation or a proximity manipulation with a finger, a stylus or the like. The manipulation input part 9 may employ any scheme including the resistive film scheme, the capacitance scheme, the surface capacitance scheme, the projected capacitive touch scheme, the surface acoustic wave scheme, the optical scheme, and the electromagnetic induction scheme. Note that, in the following, a description will be given representatively of a manipulation with a finger. However, a manipulation with a stylus or the like works similarly to the manipulation with a finger. Note that, as to the manipulation input part 9, the entire or just part of the screen may serve as a region capable of accepting a manipulation.

The display part 10 may employ any scheme including the liquid crystal panel and the organic EL panel. Preferably, the manipulation input part 9 is structured on the display part 10. However, without being limited thereto, the display part 10 and the manipulation input part 9 may be structured separately from each other. For example, the mode in which the display part 10 and the manipulation input part 9 are separated from each other and the display region and the manipulation region are separated from each other, and the mode in which the display part 10 and the manipulation input part 9 are physically separated into two screens are also included in the concept of the display apparatus 2. That is, the display apparatus 2 may be any apparatus so long as it includes a manipulation input part that accepts a contact manipulation or a proximity manipulation.

The input part 3 is a button or any of various apparatuses for accepting an input other than the manipulation input part 9. The storage part 4 is a storage apparatus other than the ROM 7 and the RAM 8. For example, the storage part 4 is a hard disk or a removable memory. The communication part 5 is a wired or wireless communication apparatus for establishing external communication.

Figure 2:
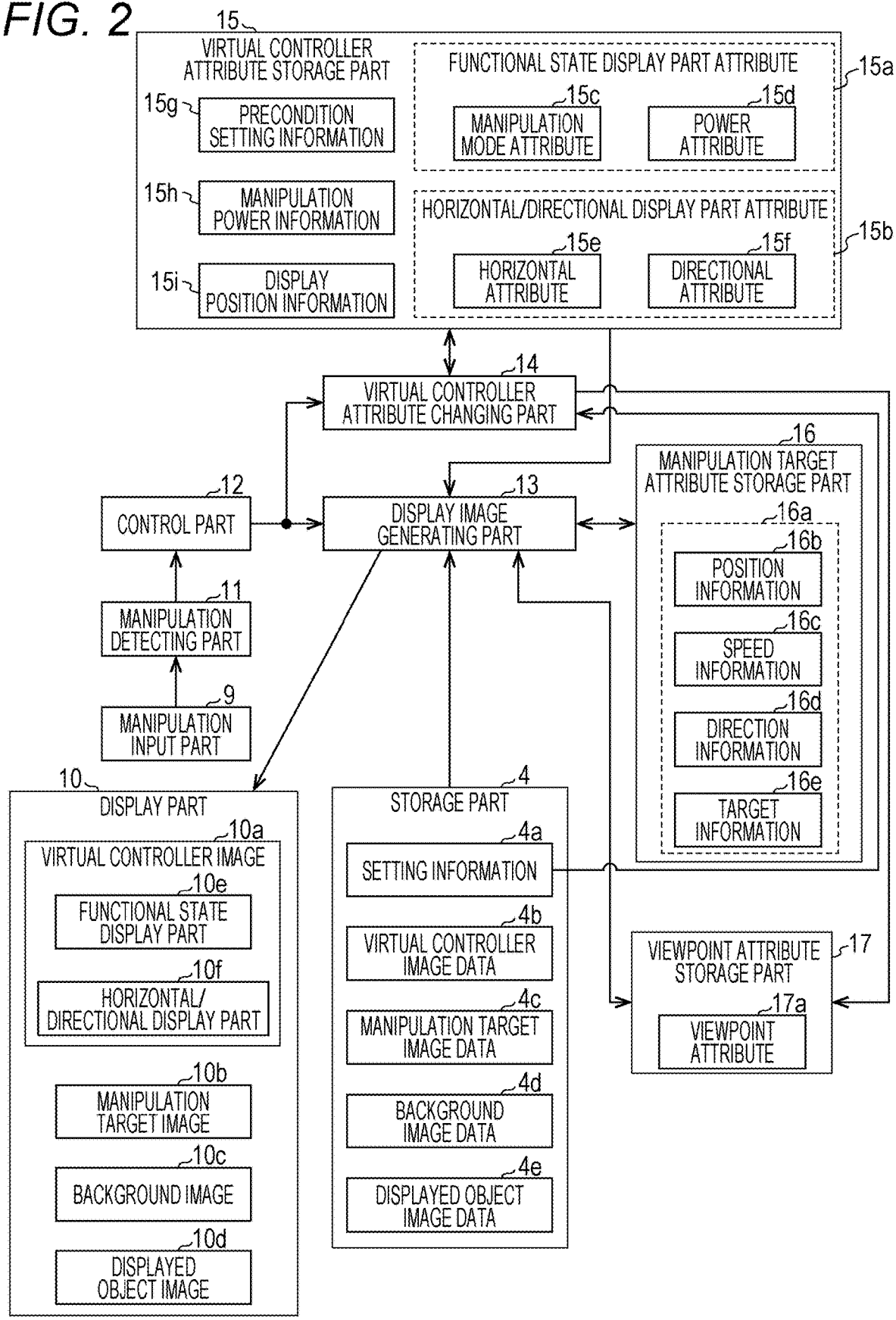
FIG. 2 is a functional block diagram showing functions that the computer 1 executing the program of the present invention would have.

The CPU 6 having read the program stored in the storage part 4 or the ROM 7, as a non-transitory storage medium or transitory storage medium, controls the operation of the entire computer 1. Thus, the program of the present invention is executed. FIG. 2 is a functional block diagram showing the functions that the computer 1 executing the program of the present invention would have. FIG. 3 is a table of contents of data used in the program of the present invention. In the following, with reference to FIGS. 2 and 3, a description will be given of the functions that the computer apparatus would have by executing the program of the present invention. It goes without saying that, in construing the following description, the term " . . . part" can be replaced by the term " . . . module".

The control part 12 controls the operation of the entire computer 1. When the program is being executed, the control part 12 causes the virtual controller attribute changing part 14 to change the attribute of the virtual controller image, or causes the display image generating part 13 to generate a necessary image for each frame, thereby causing the display part 10 as hardware to display the necessary image.

In the drawings, the images displayed on the display part 10 are a virtual controller image 10a, a manipulation target image 10b, a background image 10c, and a displayed object image 10d. Note that, they are merely examples.

The virtual controller age 10a is structured by a functional state display part 10e and a horizontal/directional display part 10f. The functional state display part 10e is structured by an image indicating the power and an image indicating the manipulation mode. The horizontal/directional display part 10f is structured by an image indicating the direction and an image indicating the horizontal plane or a plane parallel to the ground.

The image indicating the power is referred to as a first image. The first image indicating the power may be expressed, as part of the functional state display part 10e, by a meter value, a count value, a numerical value, color, size, a shape, a rotation speed or the like. As used herein, the power not only refers to the shift speed of the manipulation target but also the strength, the weight, the size or the like. Note that, the power is not limited to the foregoing exemplary power.

The image indicating the direction is referred to as a second image. The second image indicating the direction may be expressed by an arrow, any pointing shape, or color in a directional display part 10f-2 being part of the horizontal/directional display part 10f. As used herein, the direction not only refers to the shift direction of the manipulation target, but also the attack direction, the defense direction and the like. Note that, the direction is not limited to the foregoing exemplary directions.

In the present invention, at least one of the first image and the second image may be included in the virtual controller image. Note that, in the embodiment of the present invention, the first and second images are included in the virtual controller image.

The image indicating a manipulation mode is referred to as a third image. When there exists just one manipulation mode, the first image also serves as the third image. On the other hand, when there exists a plurality of manipulation modes, the third image indicating each of the manipulation modes is included in the virtual controller image. The third image indicating each of the manipulation modes may be expressed so as to distinguish between the manipulation modes by the shape, color and the like.

The image indicating the horizontal plane or a plane parallel to the ground is referred to as a fourth image. When it is not necessary to indicate the horizontal plane or a plane parallel to the ground, it is not necessary to display the fourth image in the virtual controller image. Hence, the fourth image is not essential. However, when the virtual screen is expressed by three-dimensional space, displaying the fourth image allows the user to easily recognize on what viewpoint the view is displayed. Therefore, in the following description, the fourth image is used. The fourth image expresses, in a horizontal display part 10f-1 being part of the horizontal/directional display part 10f, the horizontal plane or a plane parallel to the ground by a ring-like shape, a circular shape, a planar shape, a polygonal shape or the like.

Note that, herein, the fourth image is exemplarily shown as the horizontal plane or a plane parallel to the ground. Note that, the fourth image is not limited thereto. In addition to the horizontal plane or the ground, the boundary plane relative to the atmosphere, the cloud, the photic zone or the like can be represented by the fourth image. Accordingly, the fourth image can be regarded as an image indicating the reference plane such as the horizontal plane, the ground, or the boundary plane relative to the atmosphere, the cloud, or the photic zone. The fourth image allows the user to recognize the positional relationship between the reference plane and the manipulation target. In the following, the description will be given using the terms such as the horizontal plane or the horizontal attribute. However, in the case where the fourth image using the concept of the reference plane is used, such a phrase can be read as appropriate as the attribute relating to the reference plane or the reference plane. Thus, the technical content of an aspect of the present invention using the reference plane can also be understood.

Note that, what shape the virtual controller image of the present invention assumes does not limit the present invention. The virtual controller is not limited to that disclosed in the drawings and the description.

The manipulation target image 10b is a character, an object and the like being the manipulation target. The background image 10c is an image of the background. The displayed object image 10d is image data relating to any displayed object other than the manipulation target. That is, the displayed object image 10d is an image other than the virtual controller image 10a, the manipulation target image 10b, and the background image 10c.

When the manipulation input part 9 as hardware is manipulated with a finger, the control part 12 receives information on the manipulation content from the manipulation detecting part 11, and causes the virtual controller attribute changing part 14 and the display image generating part 13 to execute any necessary operation corresponding to the manipulation content.

When the manipulation input part 9 is manipulated with a finger, the manipulation detecting part 11 sends the manipulated content performed on the manipulation input part 9 to the control part 12. For example, the manipulation detecting part 11 sends, for each frame, information on the contact position to the control part 12. Further, over the frames, the manipulation detecting part 11 sends, to the control part 12, information as to whether the manipulation is a tap, a swipe, a flick, a double tap, a touch and hold, a drag and the like, together with the attribute such as the direction and the length.

The storage part 4 as hardware previously stores setting information 4a, virtual controller age data 4b, manipulation target image data 4c, background image data 4d, and displayed object image data 4e. The setting information 4a is data relating to information on the initial setting or to the setting used when the previous program ends (such as precondition setting information 15g, manipulation power information 15h, and display position information 15i which will be described later). The virtual controller image data 4b is data necessary for displaying the virtual controller image 10a. The manipulation target image data 4c is data necessary for displaying the manipulation target image 10b. The background image data 4d is data necessary for displaying the background image 10c. The displayed object image data 4e is data necessary for displaying the displayed object image 10d.

The display image generating part 13 uses various types of data previously stored in the storage part 4, to generate an image to be displayed on the display part 10. Here, the image to be displayed needs to be changed according to the progress of the program. Accordingly, FIG. 2 shows a virtual controller attribute storage part 15, a manipulation target attribute storage part 16, and a viewpoint attribute storage part 17 which are realized in the RAM 8 for managing the pieces of information being changed according to the progress of the game.

As the game progresses, the viewpoint in the virtual space changes. Accordingly, the viewpoint attribute storage part 17 stores, as a viewpoint attribute 17a, the position of a viewpoint camera in two-dimensional virtual space or three-dimensional virtual space.

As the game progresses, the position, the speed, and the direction of a character and the like being the manipulation target change. Further, when there exists a plurality of objects each being the manipulation target, the object being the manipulation target at the current time point changes. Accordingly, the manipulation target attribute storage part 16 stores, as a manipulation target attribute 16a, position information 16b that defines the position of the manipulation target, speed information 16c that defines the shift speed of the manipulation target, direction information 16d that defines the shift direction of the manipulation target, and target information 16e that defines which object is the manipulation target.

As the game progresses, the virtual controller image changes. The attribute relating to the functional state display part 10e is stored, as a functional state display part attribute 15a, in the virtual controller attribute storage part 15. The functional state display part attribute 15a includes the attribute relating to the manipulation mode (a manipulation mode attribute 15c) and the attribute defining the power (a power attribute 15d). In the present embodiment, as the manipulation mode attribute, a normal mode, an automatic shift mode, an automatic attack mode, a search mode, or a select mode is defined. However, the manipulation mode attribute is not limited to the foregoing.

The manipulation mode can be, for example, changed, increased, deleted, or extended in accordance with the intended use. The manipulation mode can be, for example, changed, increased, deleted, or extended not only on the programmer side but also by the user setting as appropriate. For example, there may be provided a program in which the manipulation mode is automatically increased when the level is raised according to the progress of the program. Alternatively, the manipulation mode may be configured so that the user can change, increase, or delete the manipulation mode as appropriate. The increase, the change and the like of the manipulation mode by the user may be associated with acquisition or purchase of an item.

The normal mode is a mode in which the manipulation target is shifted by a manual manipulation. In the normal mode, the functional state display part attribute 15a and a horizontal/directional display part attribute 15b change as being linked to the shift of a finger on the manipulation input part 9.

The automatic shift mode is a mode in which the manipulation target automatically shifts. In the automatic shift mode, irrespective of the manipulation with a finger on the manipulation input part 9, the functional state display part attribute 15a and the horizontal/directional display part attribute 15b automatically change.

The automatic attack mode is a mode in which the manipulation target is shifted by a manual manipulation while automatically executing an attack action. In the automatic attack mode, similarly to the normal mode, the functional state display part attribute 15a and the horizontal/directional display part attribute 15b change as being linked to the shift of a finger on the manipulation input part 9. Simultaneously, an attack action is automatically performed.

The search mode is a mode in which a target in the virtual space weak point of the displayed object or any hidden displayed object) is searched for. The search mode is also a mode in which the search result is displayed on the display part 10.

The select mode is a mode in which a target searched for in the search mode is selected according to the shift of a finger on the manipulation input part 9.

The attribute relating to the horizontal/directional display part 10f is stored as the horizontal/directional display part attribute 15b in the virtual controller attribute storage part 15. The horizontal/directional display part attribute 15b includes a horizontal attribute 15e that defines the positional relationship relative to the horizontal plane and a directional attribute 15f that defines a direction indicated by the horizontal/directional display part.

Further, the virtual controller attribute storage part 15 stores the precondition setting information 15g, the manipulation power information 15h, and the display position information 15i.

The precondition setting information 15g is the manipulation power information, the display position information, the function display part attribute, the horizontal/directional display part attribute, the manipulation target attribute, and the viewpoint attribute obtained when the previous program ends. The precondition setting information 15g is preferably a value stored as the setting information 4a in the storage part 4 when the process ends and read from the storage part 4 when the process starts, but the present invention is not limited thereto.

The manipulation power information 15h is information defining the relationship between the shift of a finger and the change rate of the power attribute. For example, when the screen is small, as compared to the case where a large screen is used, the increase rate of the power becomes greater despite a smaller shift of a finger. In this manner, the manipulation power information may be automatically set according to the screen size of the display apparatus 2. In the present invention, any definition may be employed as to the relationship between the shift of a finger and the change rate of the power attribute. The manipulation power information 15h is an automatically or manually set content describing, for example as to a swipe, a greater increase in the power despite a smaller finger shift, or conversely, a smaller increase in the power despite a greater finger shift. Further, as to a flick, the change rate (the acceleration rate) of the shift of a finger in performing a flick may be the change rate of the power attribute. Further, the change rate between the shift of a finger and the power attribute can be adjusted as appropriate by the user.

The display position information 15i is information that defines the display position of the virtual controller image. For example, in the setting of displaying the virtual controller image at a fixed position, that fixed position is defined as the display position information 15i. Additionally, in the display position information 15i, it is also possible to define that the virtual controller image is displayed near the touch position, or to define that the virtual controller image is displayed above the manipulation target. Further, when the virtual controller image is to be shifting, the position information of the virtual controller image is stored in the display position information 15i.

At the start of a process, the virtual controller attribute changing part 14 reads the setting information 4a stored in the storage part 4. Then, the virtual controller attribute changing part 14 sets the precondition setting information 15g, the manipulation power information 15h, and the display position information 15i of the virtual controller attribute storage part 15. At the end of a process, the virtual controller attribute changing part 14 reads the precondition setting information 15g, the manipulation power information 15h, and the display position information 15i obtained at the end, and stores them as the setting information 4a in the storage part 4. Note that, initial values are registered for the setting information 4a. The user can use the initial values as the setting information 4a as necessary.

Note that, the information and attributes shown in FIG. 3 are merely one example of definition. Other definition may be employed. As a matter of course, information in addition to those in FIG. 3 is necessary for the progress of the game. 3 shows information necessary for realizing the present invention.

When the manipulation detecting part 11 detects a manipulation of a finger on the manipulation input part 9, the control part 12 sends the manipulation content to the virtual controller attribute changing part 14. In accordance with the manipulation content, the virtual controller attribute changing part 14 changes the data stored in the virtual controller attribute storage part 15 as appropriate. The virtual controller attribute changing part 14 also changes the viewpoint attribute 17a stored in the viewpoint attribute storage part 17 as necessary.

In this manner, when a manipulation is performed on the manipulation input part 9, the content of the virtual controller attribute storage part 15 is rewritten in real time. Details thereof will be described later with reference to the flowcharts. In brief, for example, when a swipe manipulation is performed, the power attribute 15d is changed according to the distance traveled by the swipe. Further, when a flick manipulation is performed, the power attribute 15d is changed (increased or reduced) according to the count or the speed of the flick. As an example, the power attribute 15d being increased according to the count or the speed of a flick means that the speed of the manipulation target is accelerated. The power attribute 15d being reduced means that the speed of the manipulation target is decelerated. Further, the directional attribute 15f is changed according to the direction of a swipe or a flick, or the directional attribute 15f is changed as being linked to the shift direction of a finger performing a drag.

When the display image generating part 13 receives from the control part 12 an instruction about display timing such as frame arrival, the display image generating part 13 generates a virtual controller image to be displayed based on various kinds of information and attributes stored in the virtual controller attribute storage part 15, and the viewpoint attribute 17a stored in the viewpoint attribute storage part 17, and displays the generated virtual controller image.

For example, when the power of level 5 is represented by the power attribute 15d, the display image generating part 13 generates an image expressing that the power indicated by the functional state display part 10e is level 5 (for example, an image indicative of a meter value of 5).

For example, when the directional attribute 15f represents the northeast direction with reference to the absolute coordinates, the display image generating part 13 generates, as the image of the horizontal/directional display part 10f, an image indicating the north east direction as seen from the viewpoint represented by the viewpoint attribute 17a.

In this manner, the display image generating part 13 displays the virtual controller image 10a on the screen in real time based on the content stored in the virtual controller attribute storage part 15. Thus, the user is given the impression that the user's manipulation content is reflected on the virtual controller image 10a in real time.

Further, when the display image generating part 13 receives an instruction from the control part 12 about display timing such as frame arrival, the display image generating part 13 changes various information stored in the manipulation target attribute storage part 16, based on various information and attributes stored in the virtual controller attribute storage part 15.

Specifically, the display image generating part 13 rewrites the currently stored position information 16b based on the directional attribute 15f and the power attribute 15d. That is, when the manipulation target shifts in the virtual space within one frame in the direction and the power represented by the directional attribute 15f and the power attribute 15d, the display image generating part 13 rewrites the position of the manipulation target represented by the position information 16b.

Further, based on the comparison between the position information 16b before rewritten and the rewritten position information, or based on the power attribute 15d, the display image generating part 13 recognizes the shift speed of the manipulation target and rewrites the speed information 16c.

Further, based on the comparison between the position information 16b before rewritten and the rewritten position information, or based on the directional attribute 15d, the display image generating part 13 recognizes the shift direction of the manipulation target, and rewrites the direction information 16d. Then, based on the rewritten position information 16b, speed information 16c, and direction information 16d, and the viewpoint attribute 17a, the display image generating part 13 generates the manipulation target image 10b for the next frame and displays the generated manipulation target image 10b on the display part 10.

Note that, herein, the speed information 16c and the direction information 16d have been used as the manipulation target attribute 16a. This is because the present embodiment is based on the assumption that the shape, the color or the like of the manipulation target changes according to the speed or the direction of the manipulation target. When the shape, the color and the like of the manipulation target do not change according to the speed or the direction, the display image generating part 13 can generate the manipulation target image 10b for the next frame just by rewriting the position information 16b.

Note that, when the manipulation target is changed by the user, the display image generating part 13 rewrites the target information 16e for the newly selected manipulation target. Then, the display image generating part 13 generates a new manipulation target image 10b based on the position information 16h, the speed information 16c, the direction information 16d, and the viewpoint attribute 17a, and displays the generated manipulation target image 10b on the display part 10.

The foregoing is the overview of the functions realized by the computer 1 executing the program of the present invention. In the following, a description will be given of the flow of the operation of the program of the present invention with an exemplary specific screen. Note that, the flow of the program shown in the following is merely an example of realizing the present invention. This example does not limit the present invention. It goes without saying that, so long as a computer is caused to function as module defined by the present invention by the program of the present invention, a program executing a flow other than the flow shown in the flowcharts referred to later is included in the program of the present invention.

Note that, in the following explanation of the flowcharts, the subject of the operation is basically the computer 1. On the other hand, in the case where the explanation becomes clearer by explicitly showing the virtual functional blocks shown in FIG. 2 as the subject of the operation, the functional blocks shown in FIG. 2 are used as the subject of the operation.

Figure 4:
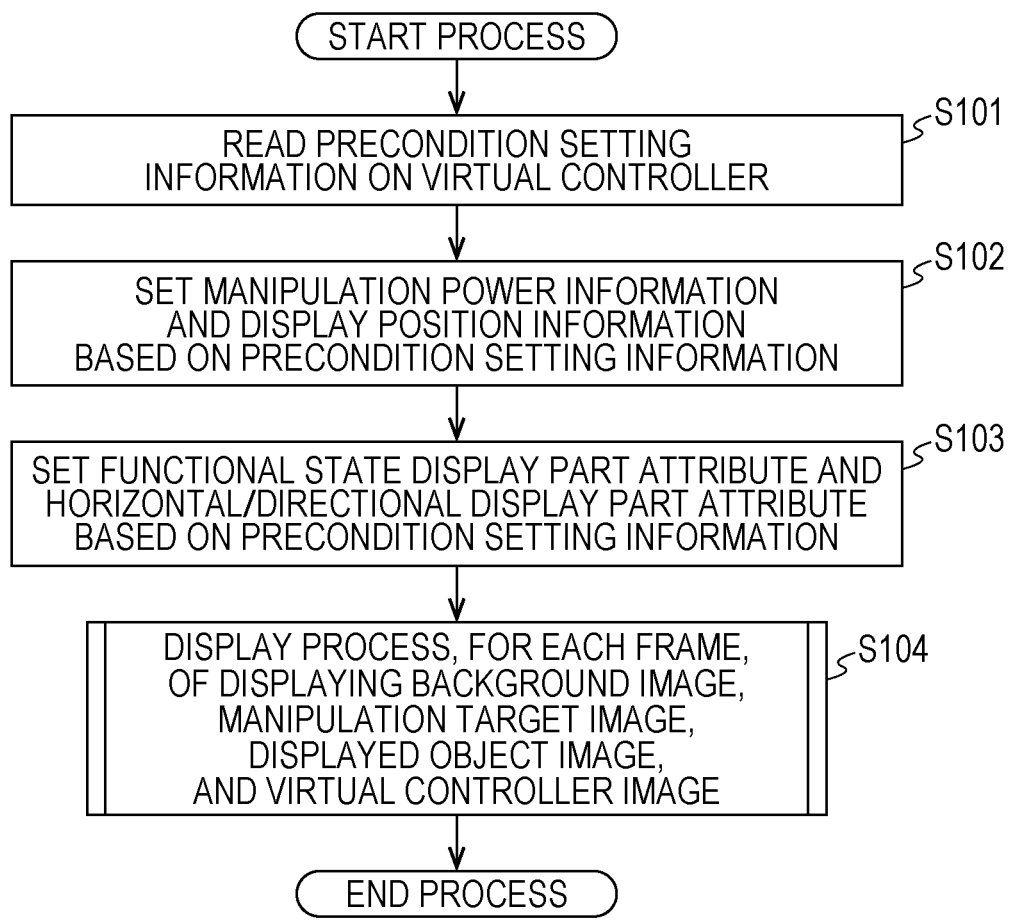
FIG. 4 is a flowchart showing the flow of the operation of the computer 1 executing the program of the present invention.

FIG. 4 is a flowchart showing the flow of the operation of the computer executing the program of the present invention. Firstly, when the process of an application is started, the virtual controller attribute changing module 14 reads the precondition setting information 15g relating to the virtual controller (S101). The virtual controller attribute changing module 14 sets the manipulation power information 15h and the display position information 15i based on the read precondition setting information 15g (S102). Further, the virtual controller attribute changing module 14 sets the functional state display part attribute 15a and the horizontal/directional display part attribute 15b based on the precondition setting information 15g (S103). In this manner, as soon as the process is started, the computer 1 executes the initial setting with the virtual controller attribute storage part 15. Thereafter, the computer 1 executes, for each frame, the process of displaying the background image, the manipulation target image, the displayed object image, and the virtual controller image (S104).

Figure 5:
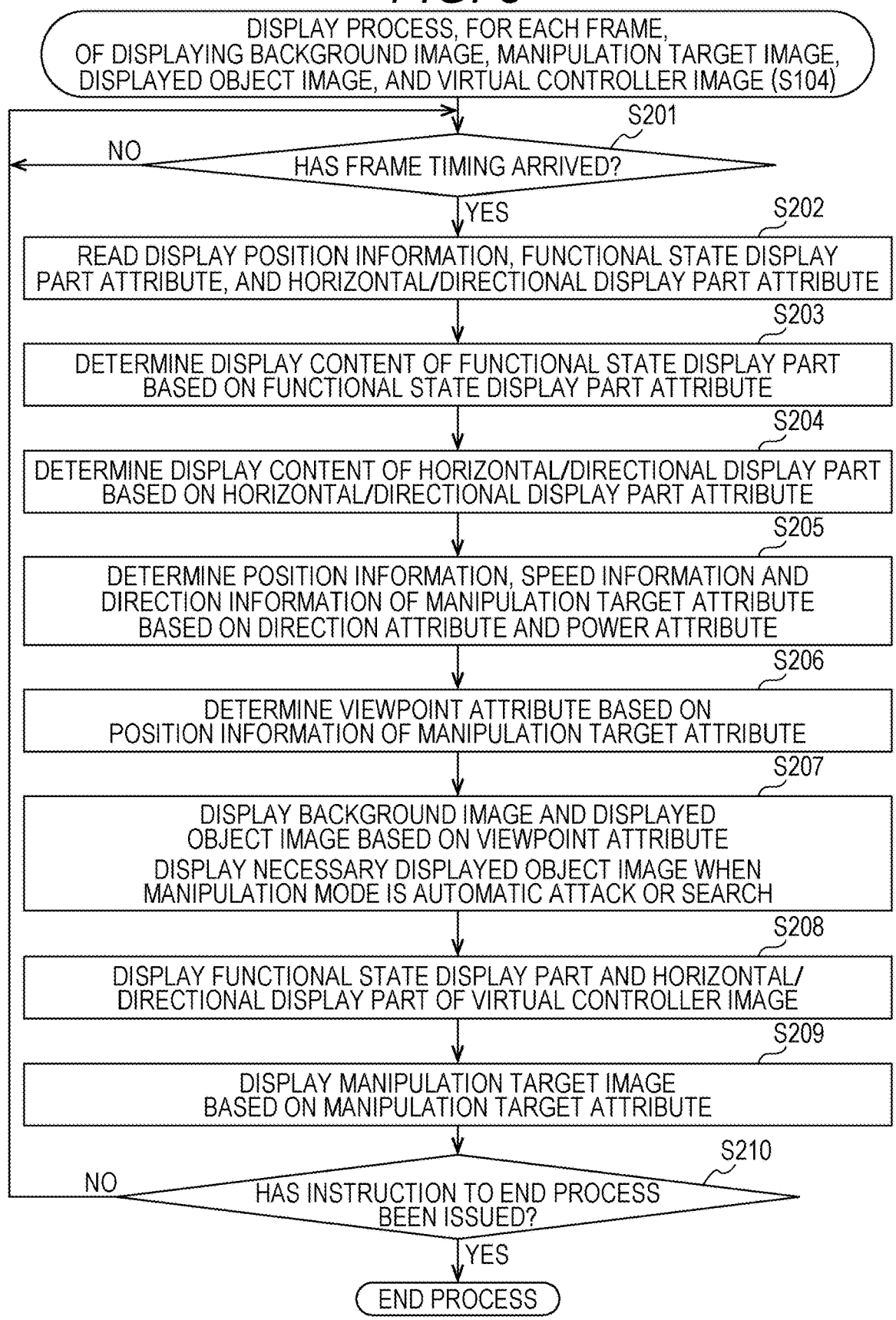
FIG. 5 is a flowchart showing details of the process in S104 in FIG. 4.

FIG. 5 is a flowchart showing the detail of the process in S104 in FIG. 4. Firstly, the computer 1 determines whether or not the frame timing has arrived (S201). The determination of the frame timing should be executed by a frame timing interrupt process or the like. Note that, the determination is not limited to the interrupt process.

When the frame timing has arrived, the display image generating part 13 reads the display position information 15i, the functional state display part attribute 15a, and the horizontal/directional display part attribute 15b (S202). Next, based on the functional state display part attribute 15a, the display image generating part 13 determines the display content of the functional state display part 10e (S203). Next, based on the horizontal/directional display part attribute 15b, the display image generating part 13 determines the display content of the horizontal/directional display part 10f (S204).

Here, a description will be given of an exemplary specific display content of the functional state display part attribute 15a and the horizontal/directional display part attribute 15b determined in S203 and S204.

FIGS. 11A to 11E are a series of an exemplary display content of the functional state display part attribute 15a and the horizontal/directional display part attribute 15b. In FIGS. 11A to 11E, 10a is the virtual controller image. 10e is the functional state display part (the first image and the third image). 10f-1 and 10f-2 represent the horizontal/directional display part 10f. 10f-1 is a horizontal display part (the fourth image) indicating a plane parallel to the horizontal plane, 10f-2 is a directional display part (the third image) indicating the direction. 10b is the manipulation target. Note that, in the virtual space, when the ground on which the manipulation target is placed is elevated or lowered relative to the horizontal plane, in the horizontal/directional display part 10f, the angle of the horizontal attribute should be changed as appropriate so that the horizontal display part 10f-1 becomes parallel to the ground under the manipulation target.

Figure 11A:
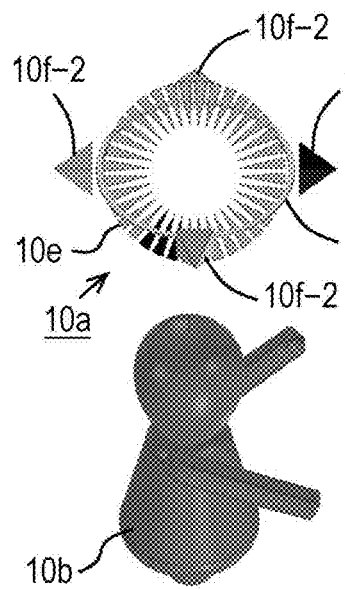
FIGS. 11A to 11E are a series of illustrations showing an exemplary display content of a functional state display part attribute 15a and a horizontal/directional display part attribute 15b.
Figure 11B:
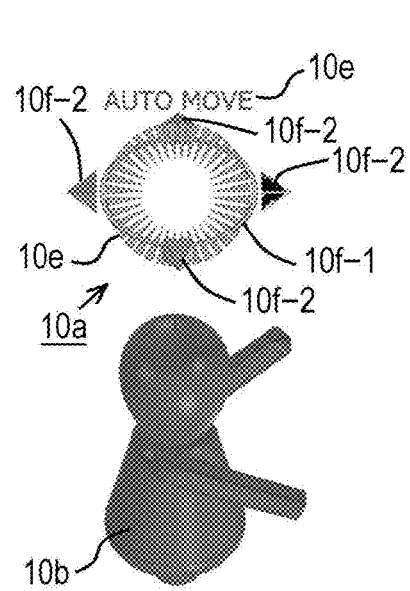
Figure 11C:
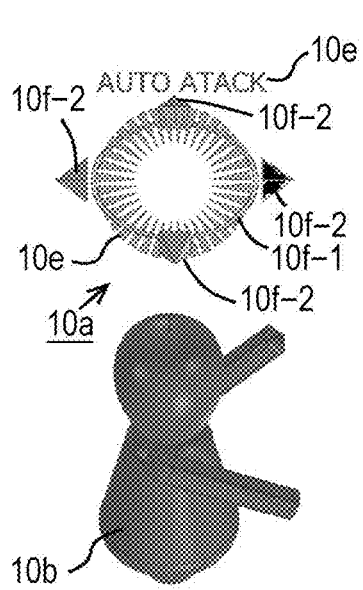
Figure 11D:
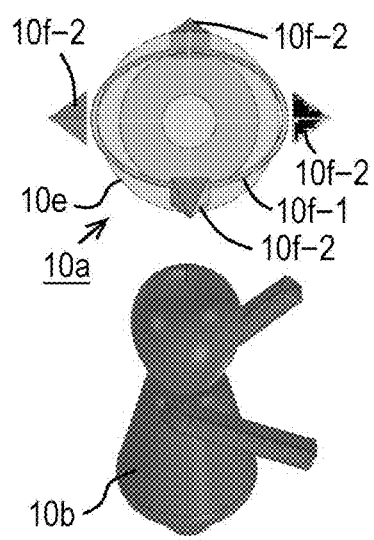
Figure 11E:
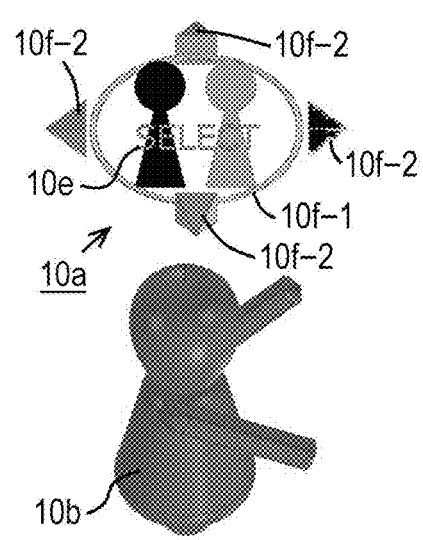

FIG. 11A is an exemplary display in the case where the manipulation mode attribute is the normal mode. FIG. 11B is an exemplary display in the case where the manipulation mode attribute is the automatic shift mode. FIG. 11C is an exemplary display in the case where the manipulation mode attribute 15c is the automatic attack mode. FIG. 11D is an exemplary display in the case where the manipulation mode attribute is the search mode. FIG. 11E is an exemplary display in the case where the manipulation mode attribute is the select mode. As can be seen from the comparison among FIGS. 11A to 11E, according to the manipulation mode attribute, the image (the third image) of the functional state display part 10e changes. In other words, the third image is changed for each manipulation mode.

Further, the functional state display part 10e expresses a meter. For example, as shown in FIG. 11A, the color of the functional state display part 10e changes according to the power attribute 13d. The change of the meter is the first image. In FIG. 11A, the meter value is changed to a level of 3.

Further, the direction where the directional display part 10f-2 changes in color indicates the direction represented by the directional attribute. By the horizontal/directional display part 10f rotating, the color-changed part of the directional display part 10f-2 indicates the direction.

In FIG. 5, after S204, based on the directional attribute 15f and the power attribute 15d, the display image generating part 13 determines the position information 16b, the speed information 16c, and the direction information 16d of the manipulation target attribute 16a (S205). Specifically, the display image generating part 13 changes the position information 16a indicated in the last frame based on the directional attribute 15f and the power attribute 15d, and calculates the position information 16a for the next frame. The calculation method is not particularly limited. For example, the vector of the shift direction may be calculated based on the directional attribute 15f and the power attribute 15d. The position information 16a for the next frame can be calculated by changing the position information 16a based on the direction and magnitude of the vector.

Figure 9:
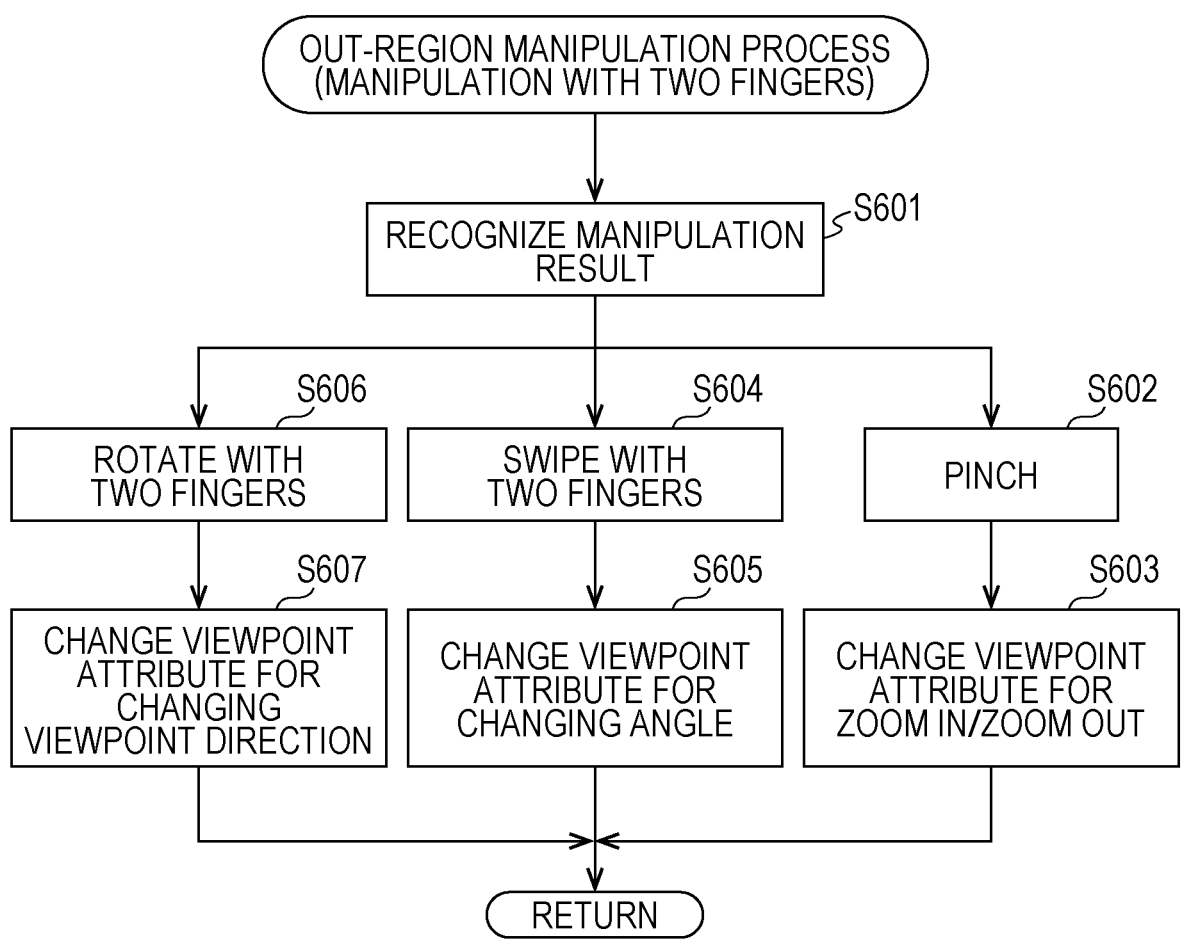
FIG. 9 is a flowchart showing the operation of the computer 1 when a manipulation is performed with two fingers, in the out-region manipulation process in S303 in FIG. 6.

Next, based on the position information 16b of the manipulation target attribute 16a, the display image generating part 13 determines the viewpoint attribute 17a in the next frame (S206). Specifically, when the viewpoint changes as being linked to the manipulation target, taking into consideration of the relative relationship with the position information 16b (for example, setting the point spaced apart by a certain distance and displaced by a certain degree from the manipulation target as the viewpoint position), the viewpoint attribute 17a is determined. Note that, when the viewpoint is fixed, the viewpoint attribute 17a is not changed and kept as it is. Note that, the viewpoint attribute changes as being linked to the shift of the manipulation target for each frame. Thereafter, the viewpoint attribute 17a is also changed by a two-finger manipulation which is shown in FIG. 9 and will be described later. In the case where the operation shown in FIG. 9 is performed also, the viewpoint attribute 17a is changed as appropriate. Therefore, the operation in S206 can be executed using the changed viewpoint attribute 17a.

Next, based on the viewpoint attribute 17a determined in S206, the display image generating part 13 generates the background image and the displayed object image from that viewpoint, and displays the generated image on the display part 10 (S207). At this time, the content of the background image or the displayed object is changed as appropriate according to the progress of the game. Also, when the manipulation mode is the automatic attack mode or the search mode, the display image generating part 13 displays any displayed object necessary for the corresponding mode (for example, an image of the attack or an image of after the search) (S207).

Next, the display image generating part 13 displays, at the position defined by the display position information 15i on the display part 10, the functional state display part 10e and the horizontal/directional display part 10f of the virtual controller image 10a determined in S203 and S204 (S208). For example, when the display position information 15i defines that the virtual controller image 10a is displayed above the manipulation target, the display image generating part 13 determines the display position of the virtual controller image 10a based on the position of the manipulation target defined by the position information 16b. Further, the display image generating part 13 displays, on the display part 10, the virtual controller image 10a as seen from the viewpoint defined by the viewpoint attribute 17a Alternatively, for example when the display position information 15i defines any fixed position (for example, upper left or lower left on the screen) as the display position of the virtual controller image 10a, the display image generating part 13 displays the virtual controller image 10a at that fixed position.

In displaying the virtual controller image 10a, the display image generating part 13 generates the horizontal/directional display part 10f so that the horizontal display part 10f-1 becomes parallel to the reference plane in the virtual space such as the horizontal plane or the ground as seen from the viewpoint defined by the viewpoint attribute 17a. Further, when the functional state display part 10e is displayed so as to constantly face the user, it becomes easier for the user to recognize the current power. Therefore, in generating the functional state display part 10e, the display image generating part 13 generates the image so that the functional state display part 10e faces the front.

Next, the display image generating part 13 generates the manipulation target image lab based on the manipulation target attribute determined in S205, and displays the generated manipulation target image 10b on the display part 10 (S209). Thereafter, until an instruction to end the process is issued, the operations from S201 to S209 are repeatedly performed for each frame (S210).

As shown in the operation in FIG. 5, for each frame, the computer 1 executing the program of the present invention reads the latest virtual controller attribute, determines the display content of the virtual controller image 10a, and displays the virtual controller image 10a. At the same time, the computer 1 determines the manipulation target attribute based on the latest virtual controller attribute, determines the display content of the manipulation target image 10b based on the latest manipulation target attribute, and displays the manipulation target image 10b. While details will be given later, in brief, the virtual controller attribute is determined minutely for each frame according to the manipulation of the user. That is, based on the virtual controller attribute determined for each frame, the manipulation target image is determined for each frame. Accordingly, the manipulation target shifts as being linked to the state of the virtual controller image. Thus, the user is given the impression that the user is manipulating the shift of the manipulation target by manipulating the virtual controller image. Accordingly, when the virtual controller attribute can be controlled minutely according to the user's manipulation, the shift of the manipulation target can be manipulated accurately. In the following, a description will be given of how the virtual controller attribute can be minutely controlled according to the manipulation of the user.

Figure 6:
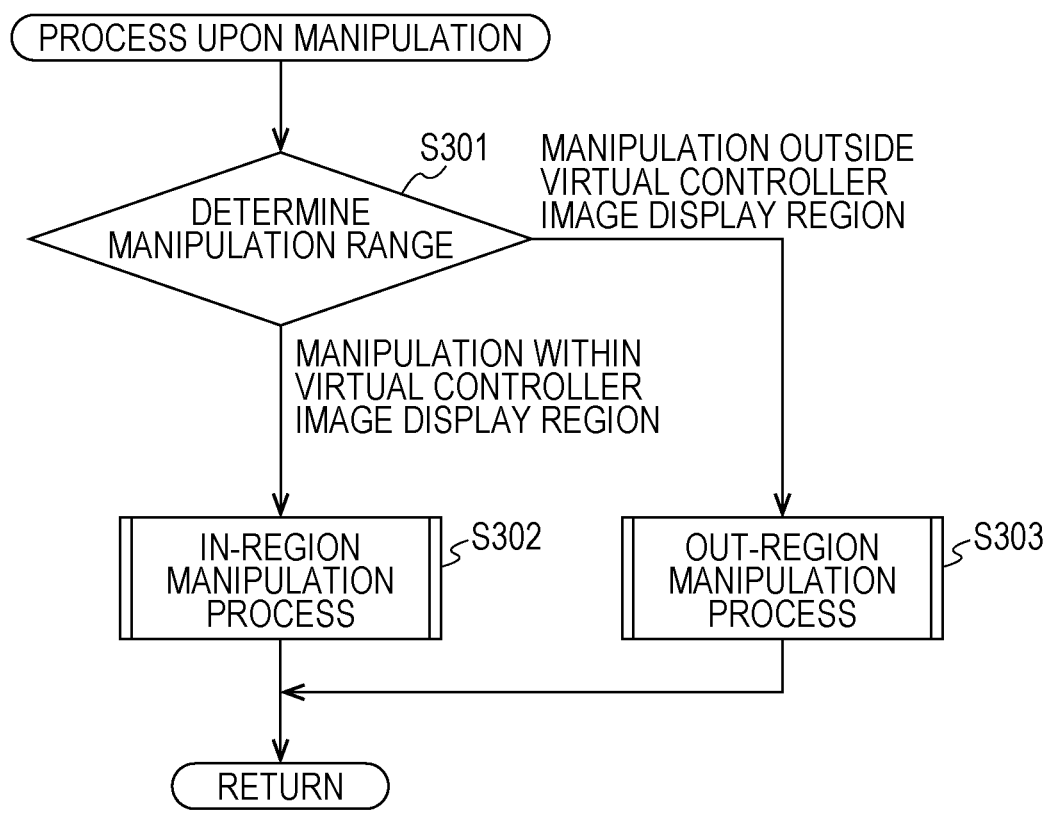
FIG. 6 is a flowchart showing the operation of the computer 1 when a manipulation is performed on a manipulation input part 9.

FIG. 6 is a flowchart showing the operation of the computer 1 when a manipulation is performed on the manipulation input part 9. The operation shown in FIG. 6 is the event that occurs when a manipulation is performed on the manipulation input part 9. The operation shown in FIG. 6 is the process that is executed in parallel to the main process shown in FIGS. 4 and 5.

Figure 13:
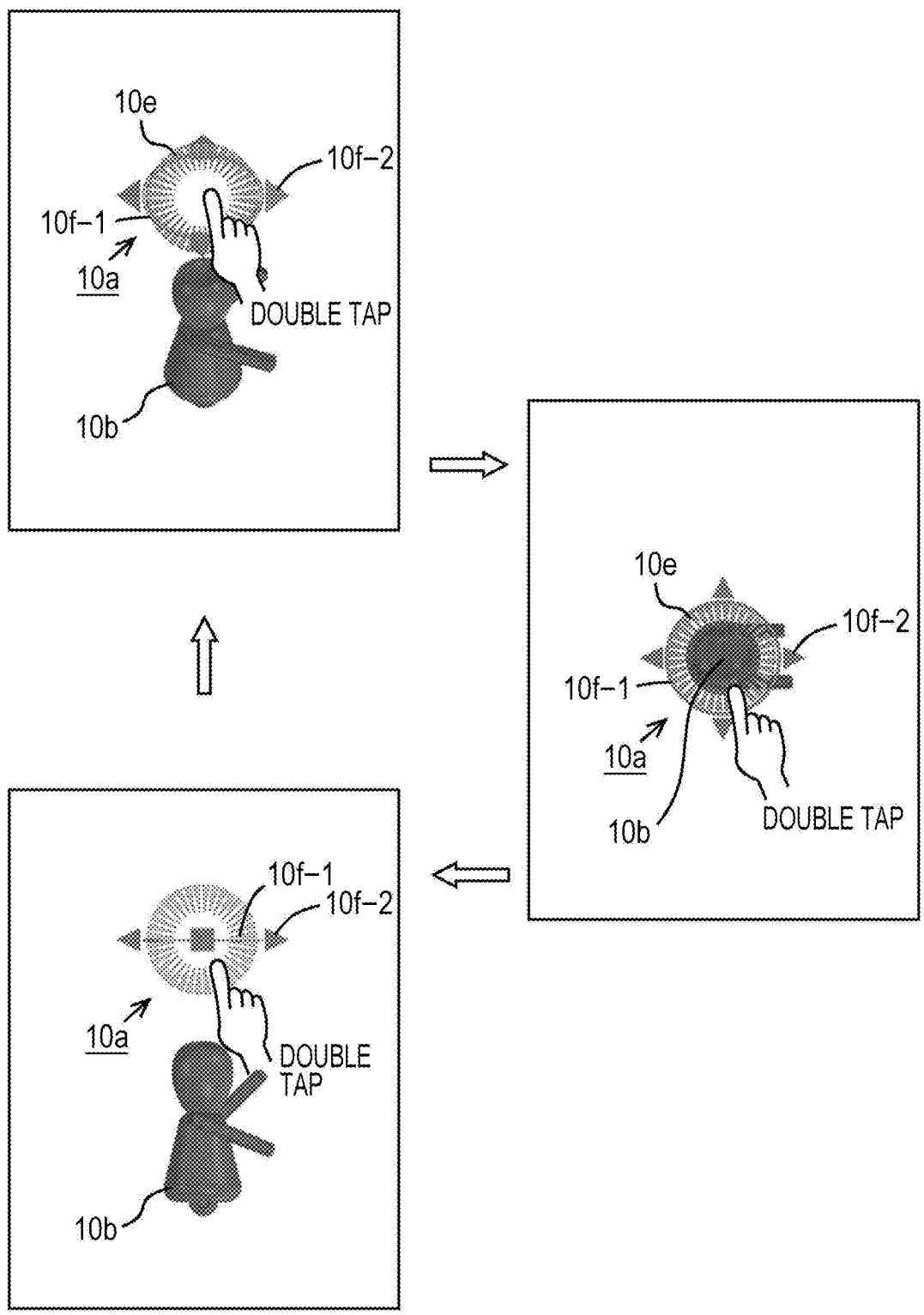
FIG. 13 is a conceptual illustration showing exemplary transition of the screen when a double tap is performed within the region.

Firstly, when a manipulation is performed, the virtual controller attribute changing part 14 determines whether the manipulation is performed within the display region of the virtual controller image 10a or outside the display region of the virtual controller image 10a (S301). A manipulation performed within the display region of the virtual controller image 10a is, for example, as shown in FIG. 13, a manipulation of touching with a finger on the virtual controller image 10a. The display region may be, for example, pixels showing the virtual controller image 10a, or a circular, quadrangular, or polygonal region approximating the virtual controller image 10a. Note that, the display region is not limited to such pixels or a region.

Figure 7:
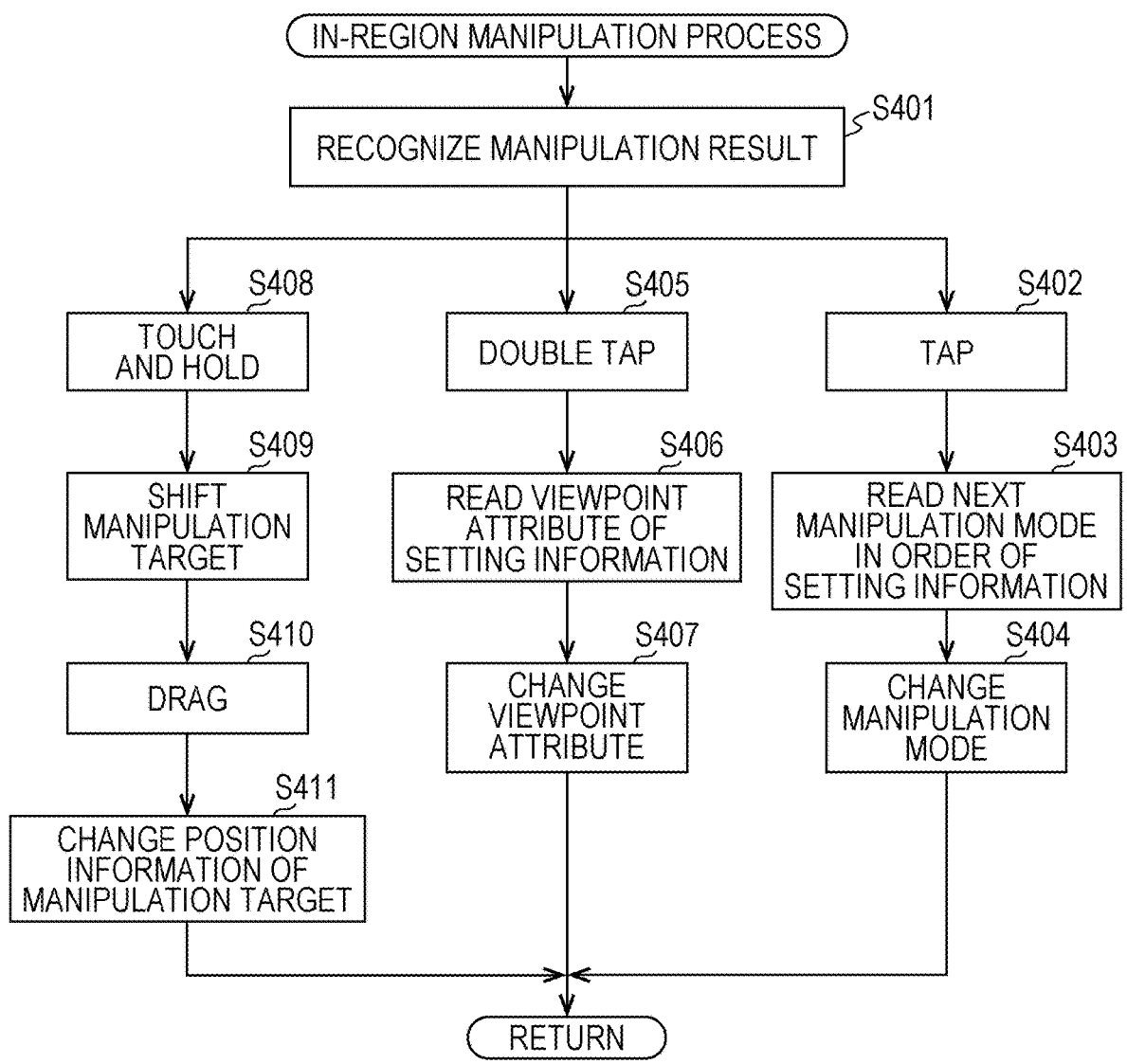
FIG. 7 is a flowchart showing the operation of the computer 1 in an in-region manipulation process in S302 in FIG. 6.
Figure 8:
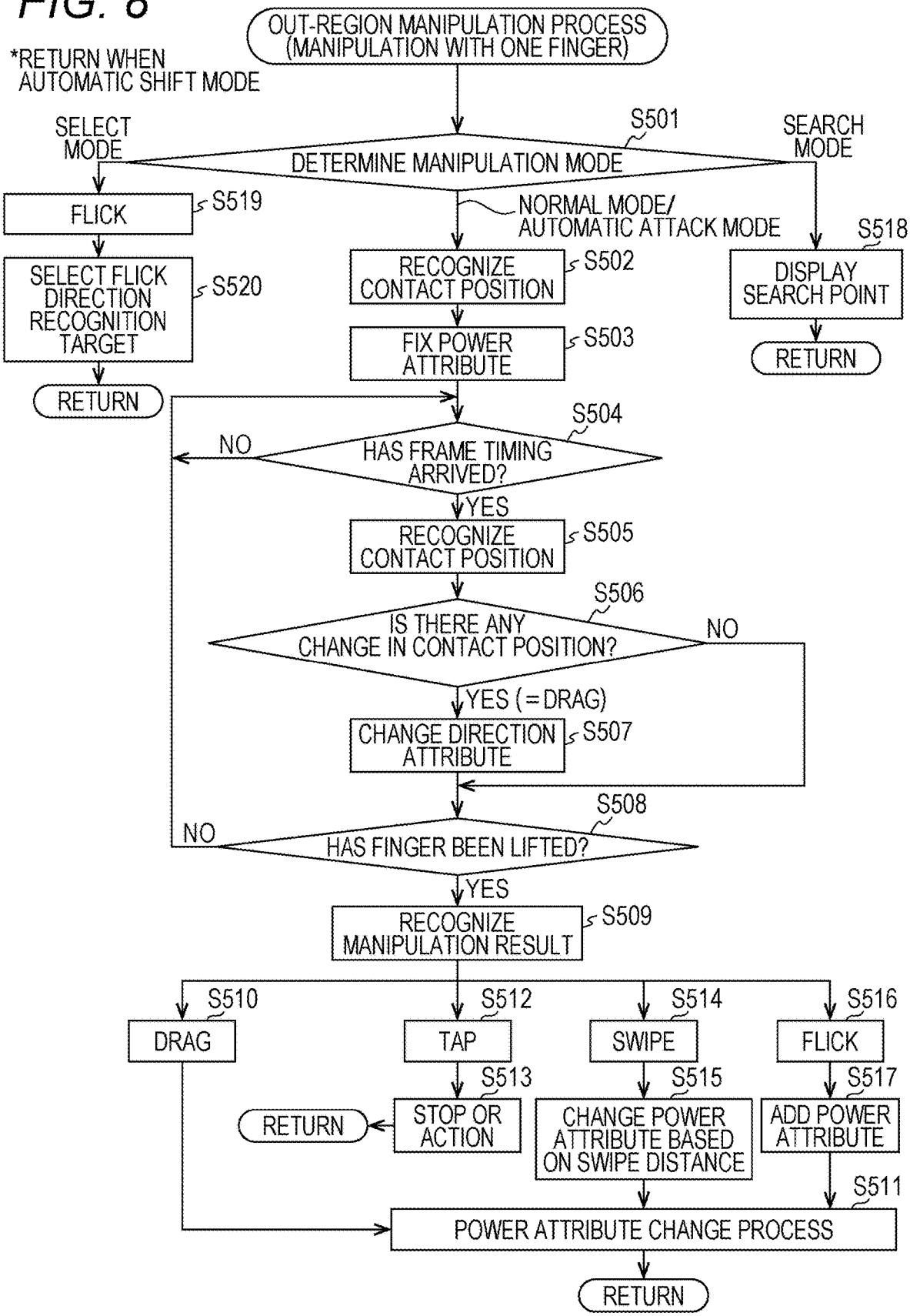
FIG. 8 is a flowchart showing the operation of the computer 1 when a manipulation is performed with one finger, in an out-region manipulation process in S303 in FIG. 6.

Upon a manipulation performed within the display region, the virtual controller attribute changing part 14 executes an in-region manipulation process in S302 (FIG. 7). On the other hand, upon a manipulation performed outside the display region, the virtual controller attribute changing part 14 executes an out-region manipulation process in S303 (FIGS. 8 and 9).

FIG. 7 is a flowchart showing the operation of the computer 1 in the in-region manipulation process in S302 in FIG. 6.

In FIG. 7, firstly, the virtual controller attribute changing part 14 recognizes what kind of manipulation is performed on the manipulation input part 9 (S401).

When a tap manipulation is performed (S402), in order of the manipulation modes previously set in the setting information 4a, the computer 1 reads the next manipulation mode (S403), and changes the manipulation mode 15c stored in the virtual controller attribute storage part 15 (S404). Note that, the order of the manipulation modes previously set is preferably changeable by the user.

The operation from S402 to S404 is performed in parallel to the operation shown in FIGS. 4 and 5. When the manipulation mode 15c is changed, in the display process for each frame shown in FIG. 5, when the next frame arrives, in S203, the display content of the functional state display pail 10e is determined based on the new manipulation mode. Accordingly, in S208, the image of the functional state display part 10e corresponding to the new manipulation mode is displayed on the screen.

After S404, the process returns. When again a tap manipulation within the region is performed, the operation from S402 to S404 is again executed, and the manipulation mode is switched to the next manipulation mode. Preferably, the order of switching the manipulation modes is in rotation.

Figure 12:
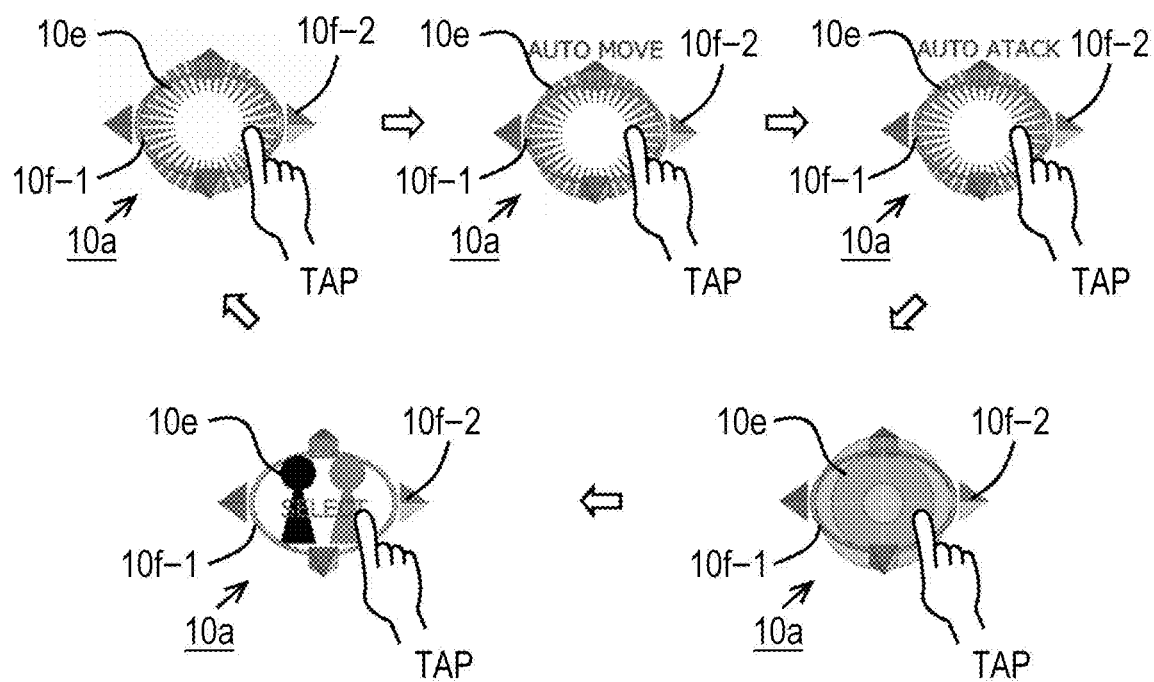
FIG. 12 is a conceptual illustration showing exemplary transition of a functional state display part 10e in a virtual controller image 10a when a tap is performed within the region.

FIG. 12 is a conceptual illustration showing exemplary transition of the functional state display part 10e in the virtual controller image 10a when a tap is performed within the region. As shown in FIG. 12, the display content of the functional state display part 10e is changed in the preset order (herein, the normal mode, to the automatic shift mode, to the automatic attack mode, to the search mode, to the select mode, and to the normal mode).

In S401, when a double tap is recognized (S405), the virtual controller attribute changing part 14 reads, in order of the viewpoint attribute preset in the setting information 4a, the next viewpoint attribute (S406), and changes the viewpoint attribute 17a stored in the viewpoint attribute storage part 17 (S407). Note that, the order of the preset viewpoint attribute is preferably changeable by the user.

After S407, the process returns. When again a double tap manipulation is performed within a region, the operation from S405 to S407 is again executed, and the next viewpoint attribute is switched to the next viewpoint attribute.

Such an operation from S405 to S407 is executed in parallel to the operation shown in FIGS. 4 and 5. When the point attribute 17a is changed, in the display process performed for each frame shown in FIG. 5, when the next frame arrives, in S207, S208, and S209, the display content of the background image, the displayed object image, the virtual controller image, and the manipulation target image are determined based on the new viewpoint attribute. Accordingly, an image corresponding to the new viewpoint attribute is displayed on the screen.

FIG. 13 is a conceptual illustration showing exemplary transition of the screen when a double tap is performed within the region. Previously, the viewpoint attribute is set in order of the viewpoint from diagonally above the manipulation target, the viewpoint from directly above the manipulation target, and the viewpoint from the front of the manipulation target. In this case, as shown in FIG. 13, by the double tap, the viewpoint from diagonally above the manipulation target is switched to the viewpoint from directly above. By the next double tap, the viewpoint from directly above is switched to the viewpoint from the front. Further, by the next double tap, the viewpoint from the front is switched to the viewpoint from diagonally above.

In S401, when a touch and hold is recognized (S408), the virtual controller attribute changing part 14 recognizes the process of picking up and shifting the manipulation target, and displays the functional state display part 10e indicating picking up the manipulation target (for example, an image suggesting pickup of the manipulation target) on the display part 10 (S409). The process of picking up and shifting the manipulation target is, for example, in the case where there are a plurality of manipulation targets such as characters that the user can manipulate, selecting a manipulation target and shifting the positional relationship by a touch and hold and a drag.

By the drag, the virtual controller image 10a and the manipulation target image 10b shift according to the shift of the finger (S410), and the virtual controller image 10a and the manipulation target image 10b are disposed at the position where the user lifts the finger. In accordance therewith, the position information 16b of the manipulation target attribute is changed (S411).

Figure 14A:
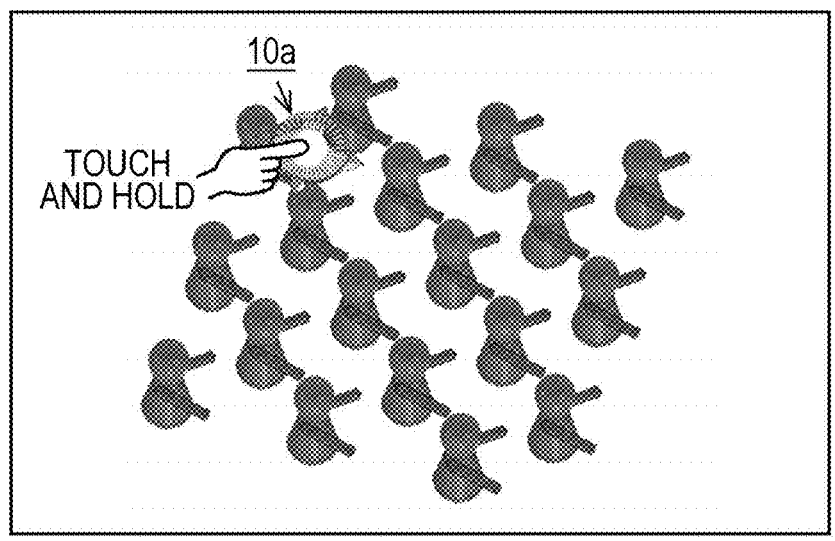
FIGS. 14A to 14C are a series of conceptual illustrations showing exemplary transition of the screen when a touch and hold is performed within the region to pick up a manipulation target, and a drag is performed to shift the manipulation target.
Figure 14B:
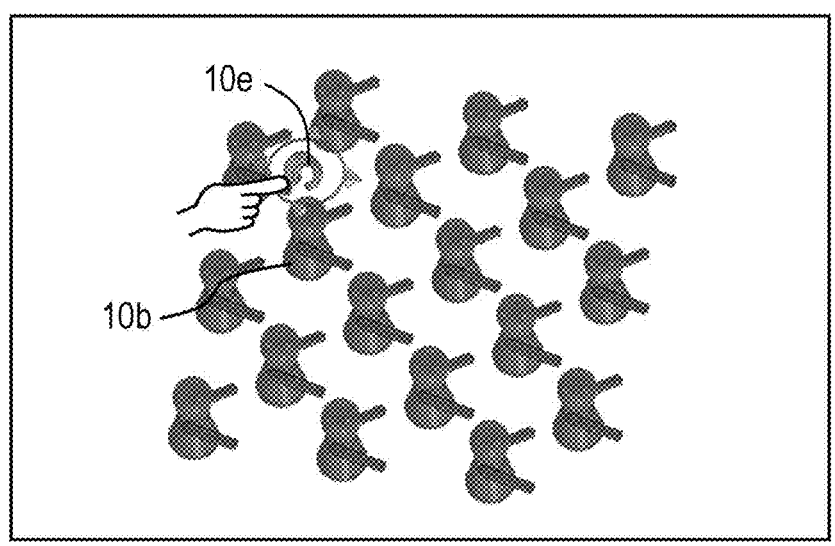
Figure 14C:
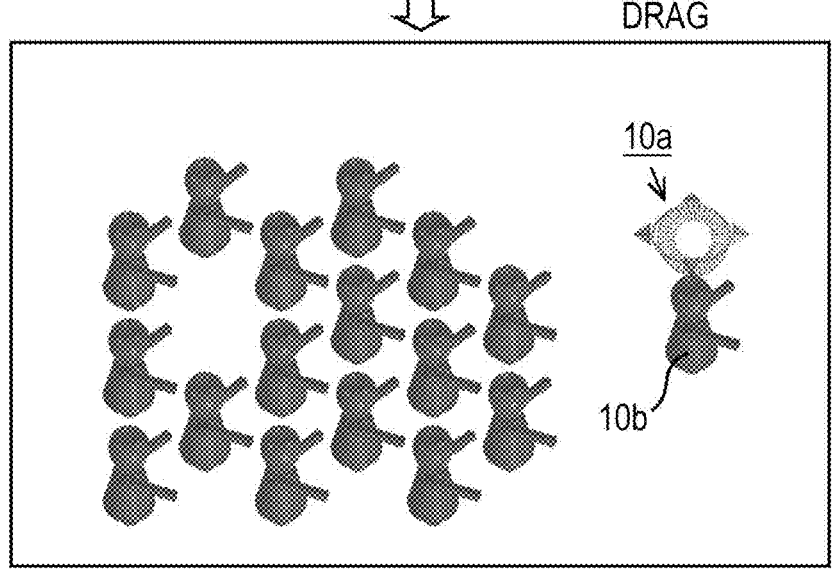

FIGS. 14A to 14C are a series of conceptual illustrations showing exemplary transition of the screen in the case where a touch and hold is performed within the region whereby the manipulation target is picked up, and a drag is performed whereby the manipulation target is shifted. Firstly, by a touch and hold, the image of the functional state display part 10e in the normal mode shown in FIG. 14A is switched to the image of the manipulation target select mode shown in FIG. 14B. Thereafter, by a drag, the display image generating part 13 displays the virtual controller image 10a and the manipulation target image 10b as being shifted according to the shift of the finger. Then, as shown in FIG. 14C, when the finger is lifted from the manipulation input part 9, the display image generating part 13 displays the virtual controller image 10a and the manipulation target image at the position where the finger is lifted.

FIG. 8 is a flowchart showing the operation of the computer 1 in the case where a manipulation is performed with one finger in the out-region manipulation process in S303 in FIG. 6. With reference to FIG. 8, the description will be given of the operation of the computer 1 when a manipulation is performed with one finger outside the region. Note that, in the operation in FIG. 8, when the manipulation mode is the automatic shift mode, the computer 1 does not accept the manipulation and just returns.

Firstly, the virtual controller attribute changing part 14 determines the manipulation mode (S501). When the manipulation mode is the normal mode or the automatic attack mode, the virtual controller attribute changing part 14 recognizes the contact position where a contact is made with a finger on the manipulation input part 9 (in the case where the manipulation input part 9 operates also with a finger being in close proximity, a proximity position is also included; the same holds true for the following) (S502). As in S511 which will be described later, a power attribute changing process is being executed. Accordingly, the power gradually changes (for example, reduces or increases). However, at the time point where the finger is brought into contact with the manipulation input part 9, the change in power is stopped. Therefore, the power attribute is fixed (S503). When the timing of the next frame has arrived (YES in S504), the virtual controller attribute changing part 14 recognizes the contact position at the current time point (S505). Here, the virtual controller attribute changing part 14 determines whether the contact position has been changed from the last recognized position (S506). Note that, in order to avoid an excessively sensitive response, in determining whether or not the contact position has been changed, a change falling within a certain range should be determined as no change in the contact position.

When a change has been made (YES in S506), this means that the finger has been shifted while keeping the contact, that is, a drag manipulation has been performed.

When a drag has been performed, the virtual controller attribute changing part 14 changes the directional attribute 15f based on the last contact position and the current contact position (S507). Note that, in S507, when the power attribute 15d represents the stop state such as a value of 0, the power attribute 15d should be increased to a preset numerical value according to the change of the directional attribute 15f so that the manipulation target shifts at a constant speed. Alternatively, when just the direction is turned in the stop state, the virtual controller attribute changing part 14 may change only the directional attribute 15f. That is, in turning the direction, the power attribute 15d being 0 is allowable. Additionally, when the power attribute 15d is 0, the virtual controller attribute changing part 14 should change the virtual controller attribute as appropriate so that a predetermined operation is realized.

Here, there may be various rules for changing the directional attribute 15f. With reference to FIGS. 15A to 15D, a description will be given of an exemplary rule for changing the directional attribute 15f.

Figure 15A:
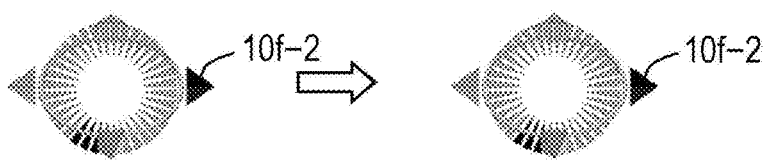
FIGS. 15A to 15D are a series of illustrations showing exemplary rules of changing a directional attribute 15f.
Figure 15B:
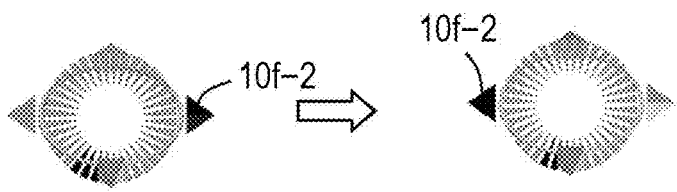

For example, as shown in FIG. 15A, when the shift direction of the contact position becomes the right direction, the directional attribute 15f is changed so that the directional display part 10f-2 indicates the right direction.

Figure 15C:
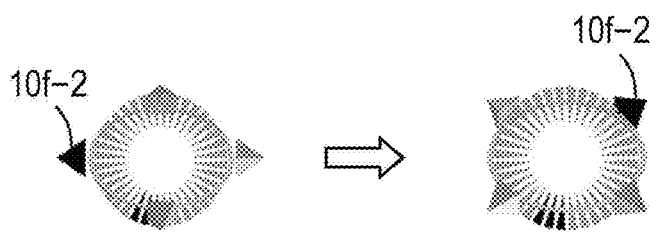
Figure 15D:
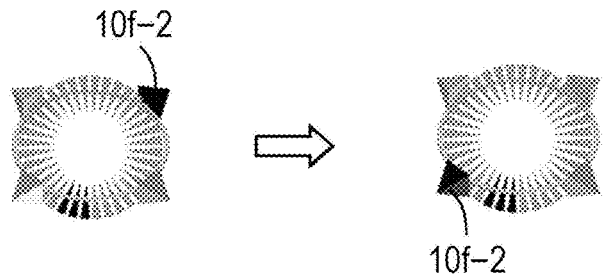

Further, as shown 15B, when the shift direction of the contact position becomes the left direction, the directional attribute 15f is changed so that the directional display part 10f-2 indicates the left direction. As shown in FIG. 15C, when the shift direction of the contact position becomes the upper right direction, the directional attribute 15f is changes so that the directional display part 10f-2 indicates the upper right direction. As shown in FIG. 15D, when the shift direction of the contact position becomes the lower left direction, the directional attribute 15f is changed so that the directional display part 10f-2 indicates the lower left direction.

Note that, when the directional display part 10f-2 instantaneously changes its indicating direction from right to left within one frame, the user may feel awkward. In this case, the directional attribute 15f should be gradually changed over a plurality of frames while complementing the change of the directional attribute 15f so that ultimately the desired direction is indicated.

After S507, the virtual controller attribute changing part 14 determines whether or not the finger has been lifted (S508). When the finger has been lifted, the virtual controller attribute changing part 14 proceeds to the operation in S509.

On the other hand, when the finger has not been lifted and kept in contact, if the contact position is changed every arrival of frame timing (that is, transition to YES in S506, being the state of a drag), the directional attribute 15f is changed by the operation from S504 to S507, and the display content of the horizontal/directional display part 10f is continuously changed. Further, in accordance therewith, the position information 16b of the manipulation target is changed following the speed based on the power attribute 15d fixed in S503 and the directional attribute 15f being continuously change. Therefore, the manipulation target is displayed on the screen as being shifted for each frame. Note that, the power attribute 15d is fixed in S503 during the drag. Therefore, the manipulation target shifts with the fixed power attribute 15d. Further, provided that the finger performing the drag once stops while being in contact with the manipulation input part 9, the power attribute 15d is fixed in S503. Therefore, with the fixed power attribute 15d, the manipulation target shifts in the direction indicated by the directional attribute 15f.

Figure 16A:
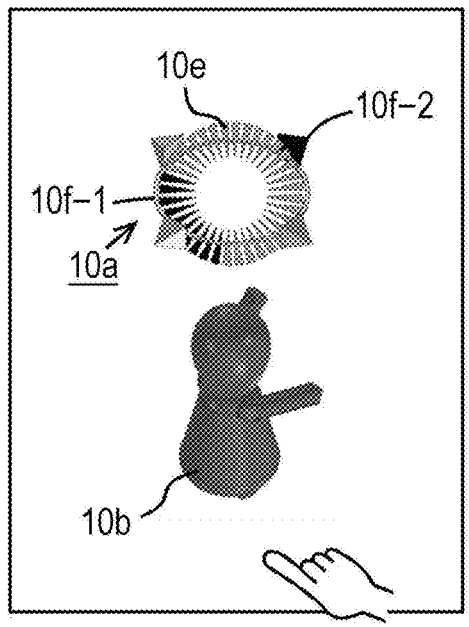
FIGS. 16A to 16D are a series of illustrations showing an exemplary screen when the shift direction of the manipulation target is changed by a drag.
Figure 16B:
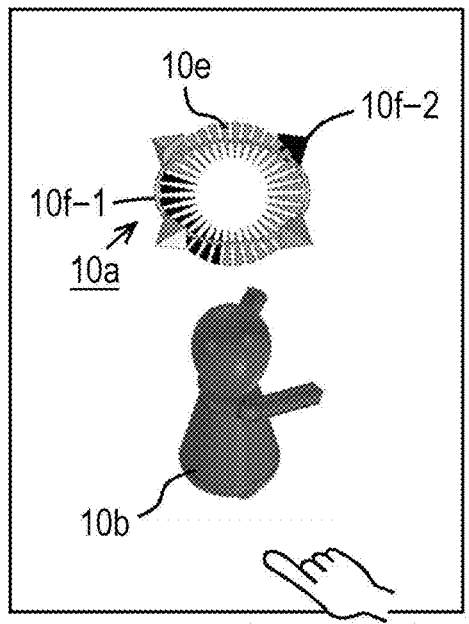
Figure 16C:
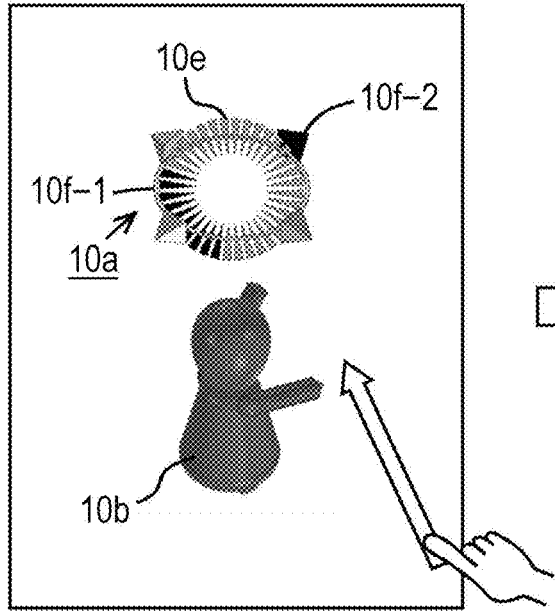
Figure 16D:
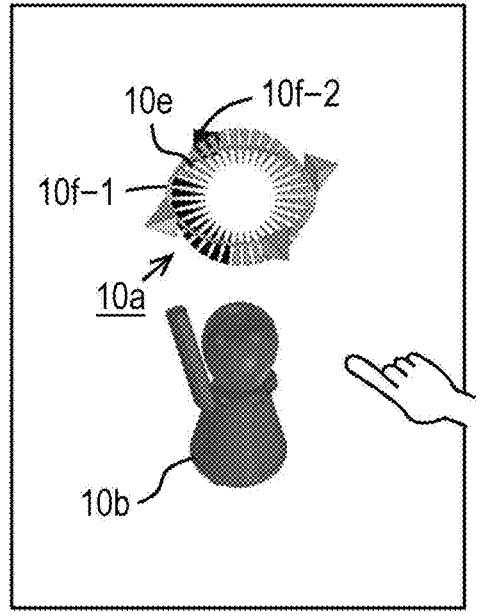

FIGS. 16A to 16D are a series of illustrations showing an exemplary screen when the shift direction of the manipulation target is changed by a drag. Firstly, as shown in FIG. 16A, when a finger is brought into contact with the screen, as shown in FIG. 16B, the meter value (the power attribute 15d) is fixed, and while the contact is maintained, the manipulation target shifts based on the fixed meter value. Thereafter, as shown in FIG. 16C, when the finger is shifted and the contact position is changed, as shown in FIG. 16D, the directional attribute 15f is changed with the meter value being fixed. In accordance therewith, the indication of the horizontal/directional display part 10f is changed, and the manipulation target shifts in the indicated direction.

By such a drag, moving the finger so as to finely adjusting the direction indicated by the horizontal/directional display part 10f of the virtual controller image 10a, the shift direction of the manipulation target can be minutely controlled. In the typical invention disclosed in Japan Patent No. 4420730, the virtual trackball is merely an index indicating the shift direction of the character, thereby failing to give the user the feeling of shifting the character by manipulating the trackball. Further, in the typical invention disclosed in Japan Patent No. 5876600, the character is merely shifted in a swiping direction. Thus, it fails to realize the operation of shifting the character while finely adjusting the rotation direction of the rotary controller. However, in the present invention, the manipulation target can be minutely shifted while finely adjusting the direction indicated by the virtual controller by a drag. Accordingly, highly accurate control is achieved.

Further, in S503, while the finger is being in contact, the power attribute 15d can be fixed. Accordingly, the user can bring his/her finger into contact at the timing of a desired speed while monitoring the meter value to fix the power attribute 15d, and in this state, the user can change the directional attribute 15f. Therefore, not only the direction but also the speed can be accurately controlled. Further, in S511 which will be described later, the power attribute 15d automatically changes (reduces or increases). Therefore, by bringing the finger into contact at a time point where the power attribute 15d has changed to reach a desired level, the power attribute 15d can be fixed. In this point also, the present invention realizes accurate control over the speed.

Referring back to FIG. 8, a description will be given of an operation in S509 and the following steps. After the finger is lifted, in S509, the virtual controller attribute changing part 14 recognizes the final manipulation. Note that, in S509, in recognizing whether the manipulation is a drag, a tap, a swipe, or a flick, conditions are previously defined, and when the defined conditions are satisfied, the virtual controller attribute changing part 14 classifies the manipulation result. For example, the definitions may be as follows: when the finger is lifted before a previously defined first time, the manipulation is a tap; when the finger is lifted before a previously defined second time later than the first time, the manipulation is a flick; when the finger is lifted before a previously defined third time later than the second time, the manipulation is a swipe; and when the finger is lifted at the third and later time points, the manipulation is a drag. Additionally, it is also possible to use the shift speed of the finger as the determination factor, and to determine as follows: when a shift speed is equal to or greater than a predetermined shift speed, the manipulation is a flick; a shift speed smaller than the predetermined shift speed, the manipulation is a swipe; and when the finger is not lifted, the manipulation is a drag. Classification of the manipulation result is not limited to the foregoing example.

In S509, when the virtual controller attribute changing part 14 recognizes that the final manipulation is a drag (S510), the control proceeds to a power attribute changing process (S511).

In the power attribute changing process in S511, the power attribute 15d is changed according to a predetermined rule (for example, the power attribute is gradually changed as the time elapses). For example, by gradually reducing the meter value indicating the power as the time elapses, the distance traveled per frame can be gradually reduced. Accordingly, it becomes possible to display the manipulation target being decelerating. Further, by gradually increasing the meter value indicating the power as the time elapses, the distance traveled per frame can be gradually increased. Accordingly, it becomes possible to display the manipulation target being accelerating.

In S509, when the virtual controller attribute changing part 14 recognizes that the final manipulation is a tap (S512), in the case where the manipulation target is shifting, the power attribute is changed to 0. When the power attribute becomes 0, the position information 16b of the manipulation target attribute 16a will not change in the subsequent frames. Therefore, the manipulation target stops (S513). Further, when the manipulation target has already been stopped in S512, the computer 1 shows any display allowing the manipulation target to perform an action (S513). Various other processes may be possible when a tap is recognized. The operation upon a tap is not limited to stop. That is, when a tap is recognized, the computer 1 should change the image and the various attributes of the manipulation target so that the manipulation target performs a predetermined operation such as actions including stop, attack, defense, transform, rotation, warp, and duplicate, or a predetermined operation such as deceleration or sudden deceleration.

In S509, when the virtual controller attribute changing part 14 recognizes that the final manipulation is a swipe (S514), the virtual controller attribute changing part 14 changes the power attribute 15d according to the distance traveled by the swipe (S515).

Figure 17A:
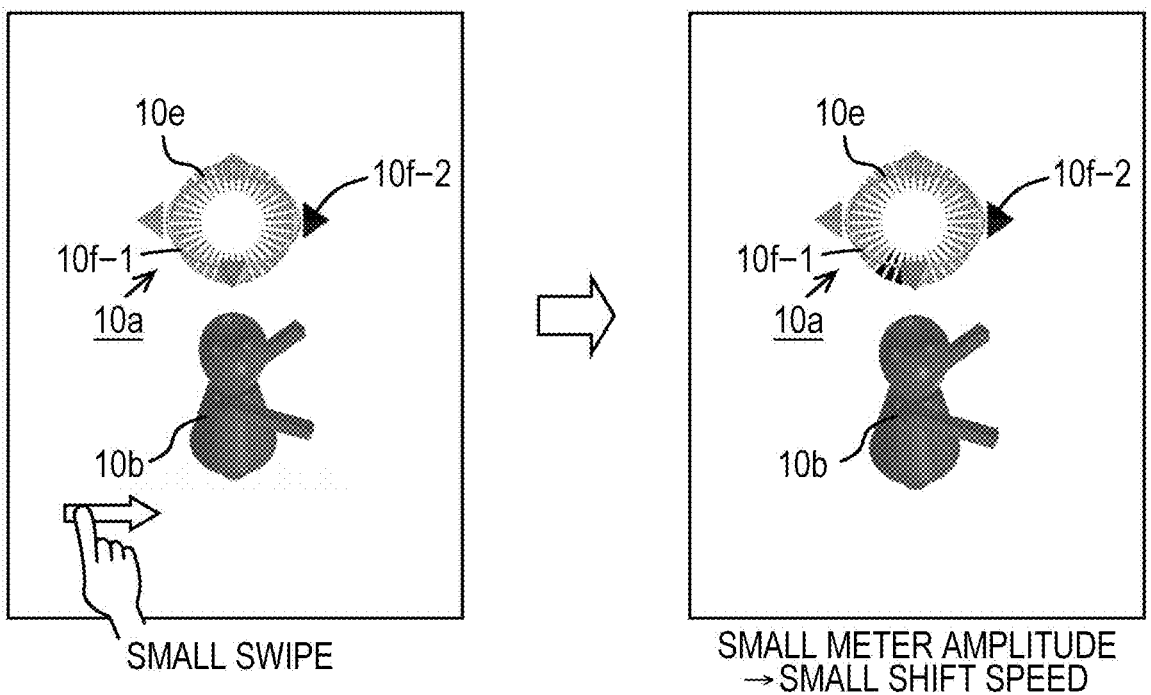
FIGS. 17A and 17B are a series of illustrations showing an exemplary screen when a swipe is performed.
Figure 17B:
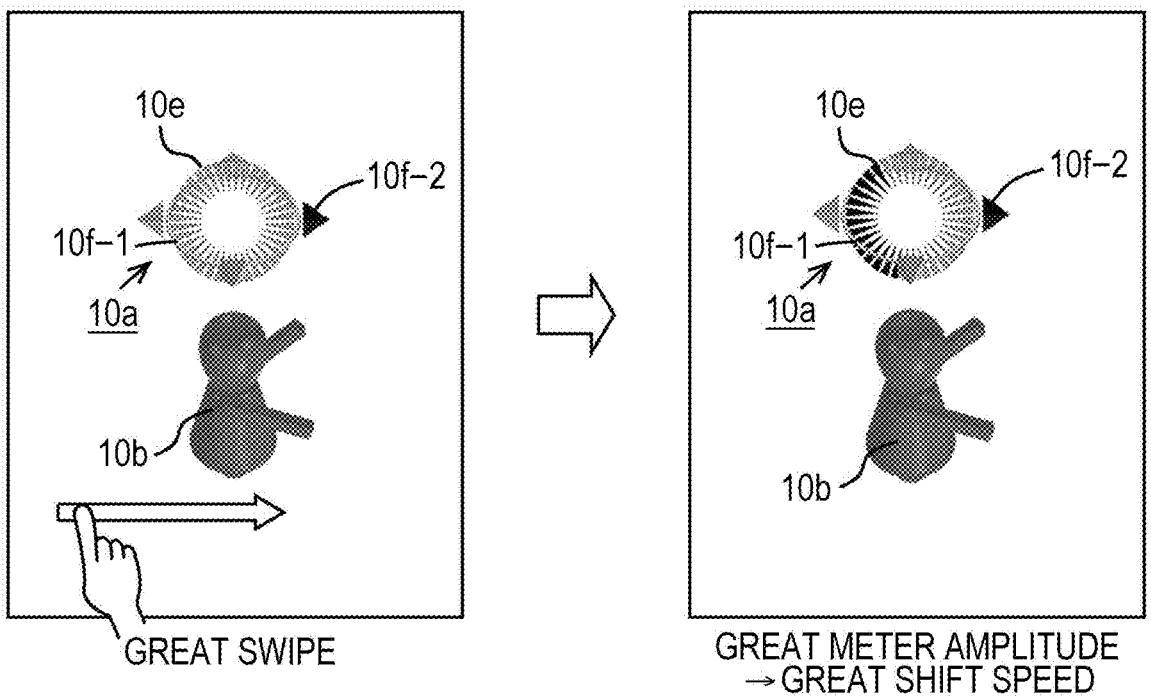

FIGS. 17A and 17B are a series of illustrations showing an exemplary screen when a swipe is performed. As shown in FIG. 17A, when a small swipe is performed, by reducing the amplitude of the meter of the power attribute 15d (that is, increasing the power attribute 15d by a small amount), the shift speed of the manipulation target can be reduced. On the other hand, as shown in FIG. 17B, when a great swipe is performed, by increasing the amplitude of the meter of the power attribute 15d (that is, increasing the power attribute 15d by a great amount), the shift speed of the manipulation target can be increased. By changing the power attribute 15d, the distance traveled per frame can be changed. Hence, it becomes possible to display the manipulation target being quickly shifting or slowly shifting.

After S515, the control transits to the power attribute changing process (S511). Therefore, by a swipe, the manipulation target shifts at the speed corresponding to the swipe distance. Thereafter, the manipulation target is displayed as being decelerating according to the preset change rate.

In S509, when the virtual controller attribute changing part 14 recognizes that the final manipulation is a flick (S516), the virtual controller attribute changing part 14 performs a process of adding a power attribute to the currently set power attribute 15d (S517). The added amount is preset. For example, it is previously determined that the increment of the value of the power attribute 15d is 3 per flick. It is also possible to calculate an increase or a reduction of the power attribute based on the count of flicks. Alternatively, an increase or a reduction of the power attribute may be calculated based on the speed of a flick. Additionally, an increase or a reduction of the power attribute may be calculated based on the information on a flick. In the present invention, it can be defined that the power attribute is changed based on a flick.

Figure 18A:
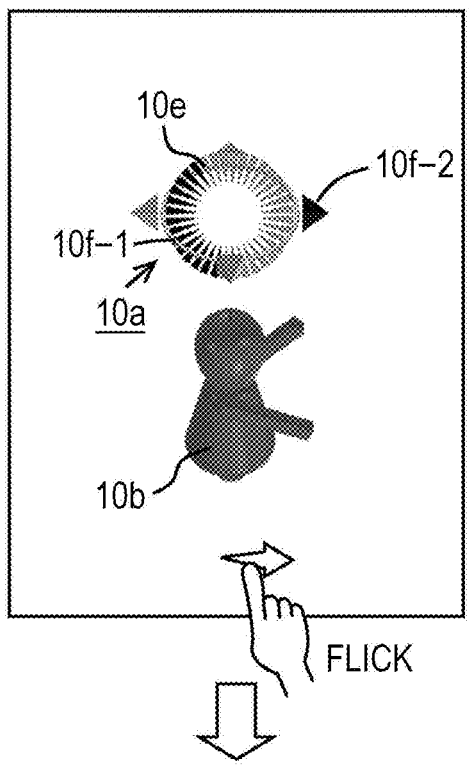
FIGS. 18A to 18C are a series of illustrations showing an exemplary screen when a flick is performed.
Figure 18B:
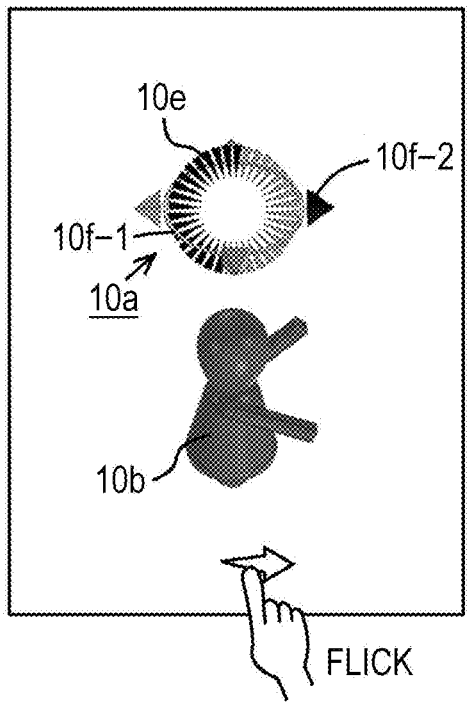
Figure 18C:
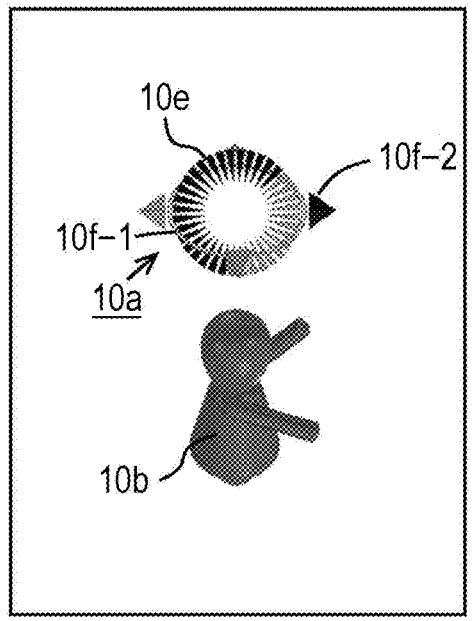

FIGS. 18A to 18C are a series of illustrations showing an exemplary screen when a flick is performed. As shown in FIG. 18A, when a flick is performed once, the display shows that the meter value indicated by the functional state display part 10e is increased by an increment for one flick (FIG.

18B). Further, after FIG. 18B, when again a flick is performed (which means, in the flowchart of FIG. 8, after S511, the operation from S501 again starts), the display shows that the meter value indicated by the functional state display part 10*e* is further increased by an increment for one flick (FIG. 18C). In this manner, the power attribute 15*d* is increased for each flick. Hence, for example, it becomes possible to display that the manipulation target is gradually accelerated.

FIGS. 19A and 19B are a series of illustrations showing an exemplary display screen when a series of processes of changing the direction, changing the shift speed, and decelerating is performed by a swipe. In FIG. 19A, when the meter value is 3, it is assumed that the user touches the screen with his/her finger, and performs a swipe upper rightward. At the time point where the finger touches the screen, the operation in FIG. 8 starts. In the process in S503, the power attribute 15*d* is fixed. Then, in S506, the shift of the finger is detected. Therefore, the directional attribute 15*f* is changed. Accordingly, the direction indicated by the directional display part 10*f*-2 is changed, and the manipulation target shifts in the changed direction. Thereafter, it is detected in S508 that, after the changing direction is performed over a plurality of frames, the finger is lifted. Then, in S509, it is recognized that the manipulation is a swipe, and as shown in the right illustration in FIG. 19A, the meter value of the functional state display part 10*e* of the virtual controller image 10*a* increases. In accordance therewith, the shift speed of the manipulation target also increases.

Thereafter, as shown in FIG. 19B, in the state where the finger is not in contact with the screen, the power attribute 15*d* gradually changes (herein, reduces). In accordance therewith, the meter value of the functional state display part 10*e* is displayed to gradually reduce. As a result, the manipulation target is also displayed to gradually decelerate.

In this manner, the value of the power attribute 15*d* can be changed according to the distance traveled by a swipe. Additionally, the power attribute 15*d* can be changed stepwise by a flick. Accordingly, the user can finely adjust the shift speed of the manipulation target by a swipe or a flick. Therefore, not only the shift direction but also the shift speed can be accurately controlled.

The description of the operation in FIG. 8 continues. In S501 in FIG. 8, when it is determined that the manipulation mode is the search mode, the display image generating part 13 displays the search point on the screen (S518).

Next, in S501 in FIG. 8, when it is determined that the manipulation mode is the select mode, and the virtual controller attribute changing part 14 detects a flick (S519), the virtual controller attribute changing part 14 recognizes the direction of the flick. According to the direction of the flick, the display image generating part 13 selects a target and displays the selected target (S520). For example, a target is a weak point display or the like. In S520, it is assumed that a plurality of flicks can be accepted, and the user can select any desired target as appropriate. After the target is selected in the select mode, for example, when a tap is performed, the process should proceed so that an attack action is made on the target.

FIG. 9 is a flowchart showing the operation of the computer 1 when a manipulation is performed with two fingers, in the out-region manipulation process in S303 in FIG. 6. With reference to FIG. 9, a description will be given of the operation of the computer 1 when a manipulation is performed with two fingers outside the region. Note that, a manipulation with two fingers includes a pinch, a swipe with two fingers, and a rotation with two fingers.

Firstly, the virtual controller attribute changing part 14 recognizes the result of a manipulation with two fingers (S601). When the manipulation is in a pinch (S602), the virtual controller attribute changing part 14 changes the viewpoint attribute for zoom in or zoom out (S603).

Figure 20A:
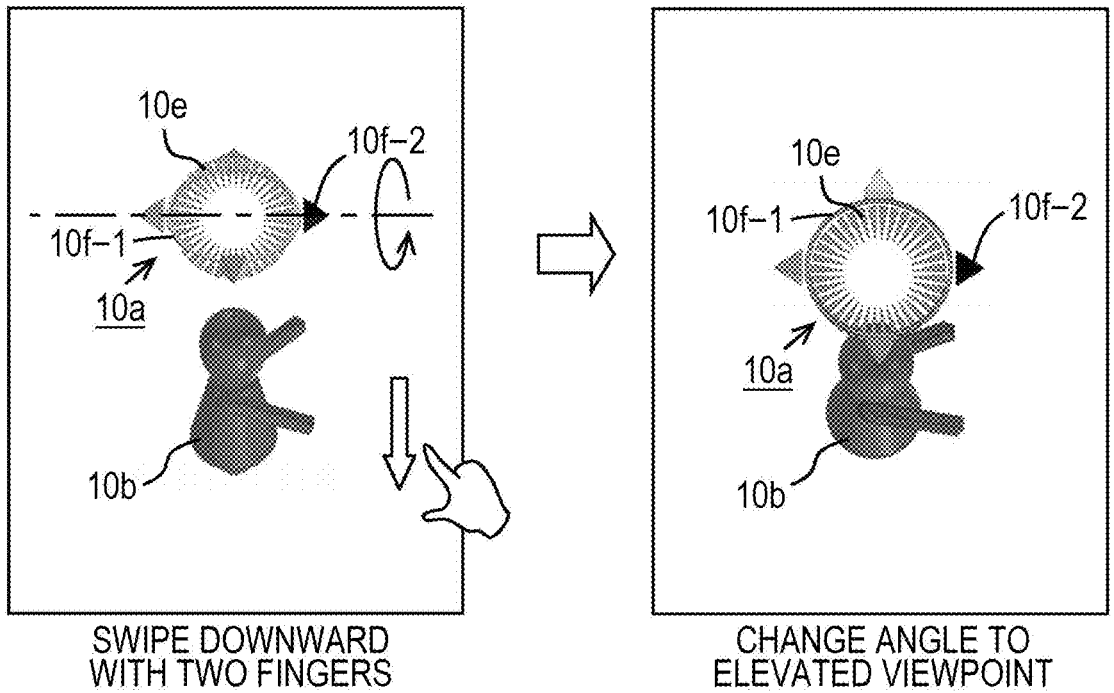
FIGS. 20A and 20B are a series of illustrations showing an exemplary screen when a swipe is performed with two fingers.
Figure 20B:
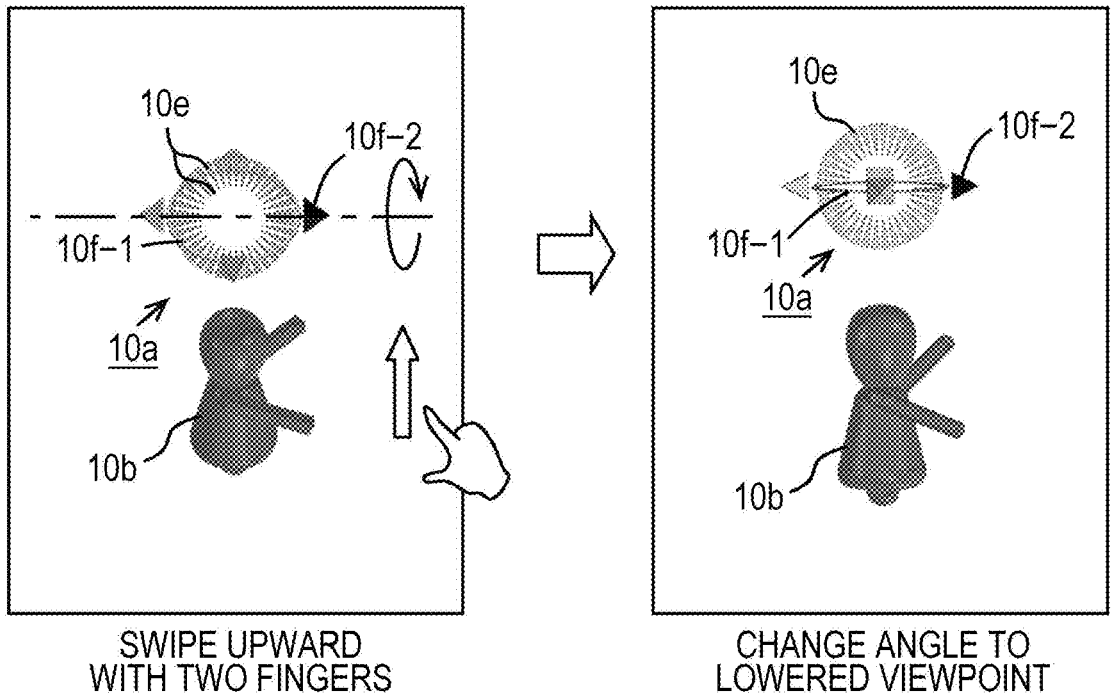

In S601, when it is recognized that a manipulation is a swipe with two fingers (S604), in order to change the angle, the virtual controller attribute changing part 14 changes the viewpoint attribute (S605). This point is described with a specific example with reference to FIGS. 20A and 20B. FIGS. 20A and 20B are a series of illustrations showing an exemplary screen when a swipe is performed with two fingers. As shown in FIG. 20A, when a swipe is performed downward with two fingers, the viewpoint is elevated. Then, the virtual controller attribute changing part 14 changes the viewpoint attribute 17*a* so that a line of sight is formed from the elevated viewpoint to the manipulation target and the virtual controller. At this time, as shown by a counterclockwise rotation arrow in FIG. 20A, the horizontal/directional display part 10*f* is displayed as being rotated relative to the horizontal plane. As to the functional state display part 10*e*, in order for the meter value to be clearly recognized, the display state of being parallel to the screen is maintained. However, the present invention is not limited thereto.

On the other hand, as shown in FIG. 20B, when a swipe is performed upward with two fingers, the viewpoint is lowered. Then, the virtual controller attribute changing part 14 changes the viewpoint attribute 17*a* so that a line of sight is formed from the lowered viewpoint to the manipulation target and the virtual controller. At this time, as shown by a clockwise rotation arrow in FIG. 20B, the horizontal/directional display part 10*f* is displayed as being rotated relative to the horizontal plane. As to the functional state display part 10*e*, in order for the meter value to be clearly recognized, the display state of being parallel to the screen is maintained. However, the present invention is not limited thereto.

In S601, when it is recognized that a manipulation is a rotation with two fingers (S606), the virtual controller attribute changing part 14 changes the viewpoint attribute 17*a* for changing the viewpoint direction (S607). For example, when a rotation is performed clockwise with two fingers, the virtual controller attribute changing part 14 changes the viewpoint attribute 17*a* so that the viewpoint also shifts in the clockwise direction. Conversely, when a rotation is performed counterclockwise with two fingers, the virtual controller attribute changing part 14 changes the viewpoint attribute 17*a* so that the viewpoint also shifts in the counterclockwise direction.

Figure 10:
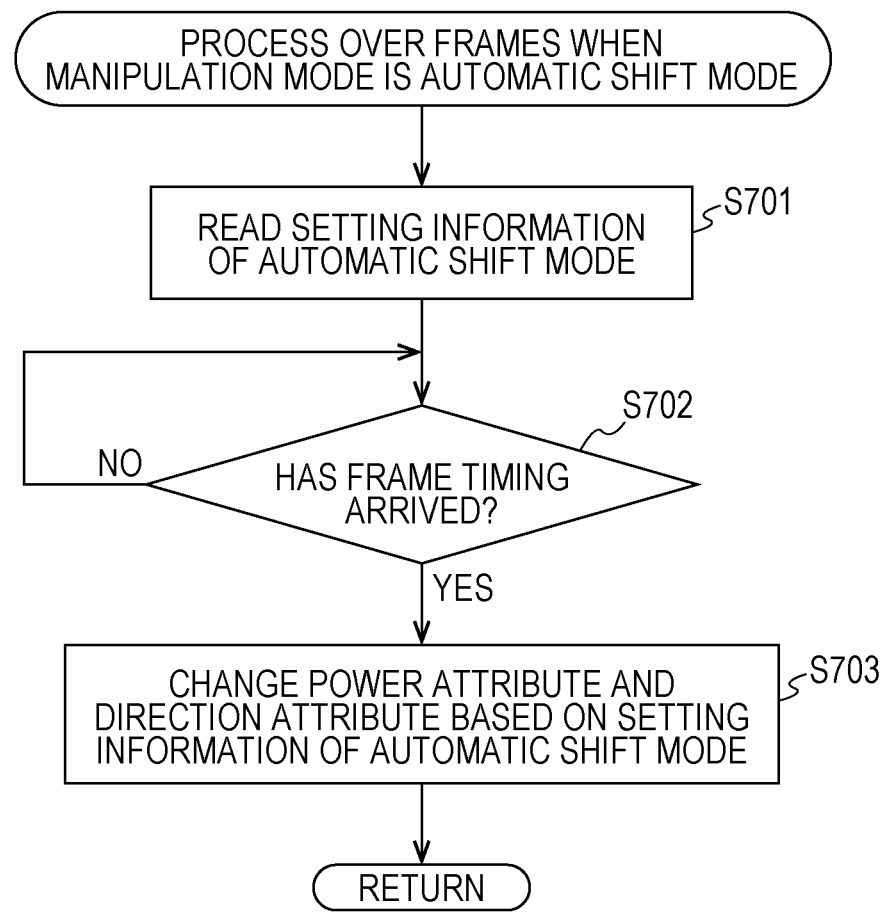
FIG. 10 is a flowchart showing the operation over frames when the manipulation mode is an automatic shift mode.

FIG. 10 is a flowchart showing the operation over frames when the manipulation mode is in the automatic shift mode. When the automatic shift mode is set, the virtual controller attribute is automatically changed irrespective of the manipulation of the user. When the virtual controller attribute automatically changes, in S205 in FIG. 5, the manipulation target attribute is also automatically changed. Therefore, the image of the manipulation target is automatically changed and, consequently, the manipulation target automatically shifts.

In the operation in FIG. 10, firstly, the virtual controller attribute changing part 14 reads the setting information 4*a* on the automatic shift mode (S701). The setting information 4*a* on the automatic shift mode may be, for example, information on the shift speed and the shift direction. The shift direction is not just a shift in a certain direction, and what may also be employed is the definition in which the shift direction changes over time following the background image. Such rules relating to the automatic shift are predetermined. According to the predetermined rules, the attribute of the virtual controller image automatically changes.

Next, when the frame timing arrives (YES in S702), the virtual controller attribute changing part 14 changes the power attribute 15d and the directional attribute 15f based on the setting information 4a of the automatic shift mode (S703). Thus, in the process in S205 in FIG. 5, the manipulation target attribute 16a is changed as being linked thereto. Thus, the automatic shift of the manipulation target is realized.

Note that, herein, in the automatic shift mode, it has been described that automatically changing the virtual controller attribute automatically changes the manipulation target attribute as being linked. However, the manipulation target attribute may be automatically changed directly without the intervention of the change in the virtual controller attribute.

The foregoing is the description of one embodiment of the program of the present invention. In the following, a description will be given of several variations.

Variations of Virtual Controller Image

Figure 21:
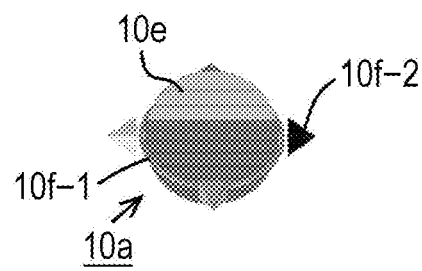
FIG. 21 shows a variation of the image of the functional state display part 10e in a normal mode.

A description will be given of variations of the virtual controller image. FIG. 21 shows a variation of the image of the functional state display part 10e in the normal mode. In the functional state display part 10e, the power should be visually recognizable. Therefore, as shown in FIG. 21, an image whose color or pattern changes in the top-bottom direction according to the power may be used. Further, it may be an image whose color or pattern changes in the right-left direction. So long as an image allows the user to visually recognize the power, the present invention is not limited to the foregoing. For example, the functional state display part 10e that indicates the power by the changes in color such as red, yellow, and blue may be used.

Figure 22:
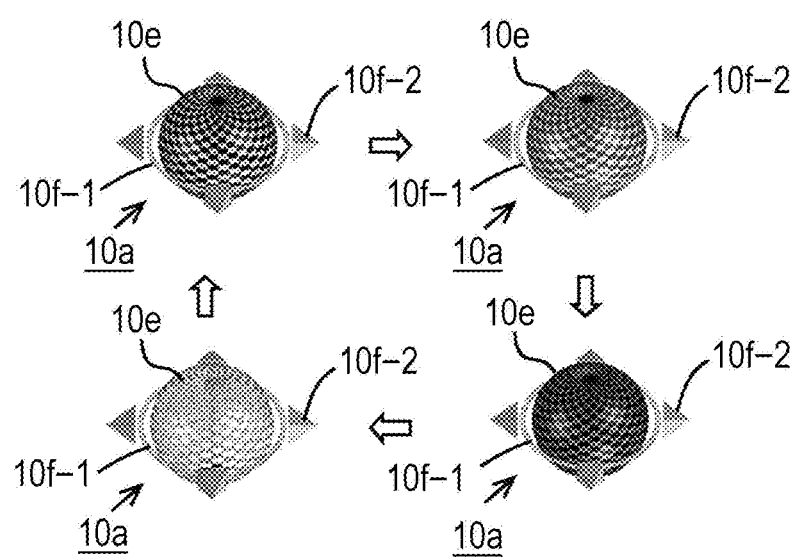
FIG. 22 shows other variation of the image of the functional state display part 10e.

FIG. 22 shows other variation of the image of the functional state display part 10e. As shown in FIG. 22, as the functional state display part 10e, an image of a sphere may be used. In this case, the power can be expressed by the rotation speed of the sphere being the first image. Further, as shown in FIG. 22, the function mode can be expressed by, for example, changes in color and pattern of the sphere.

FIGS. 21 and 22 show the variations of the image of the functional state display part 10e. Note that, as to the image of the horizontal/directional display part 10f also, as an image showing the positional relationship relative to the horizontal plane, for example, a ring shape, an oval shape, or a polygonal shape can be used. Further, as an image showing the direction, without being limited to four arrows, at least one arrow will suffice. The shape of such an arrow should be selected as appropriate. Further, without being limited to an arrow, the direction may be expressed by a shape of a finger or other mimicking shape.

Figure 23:
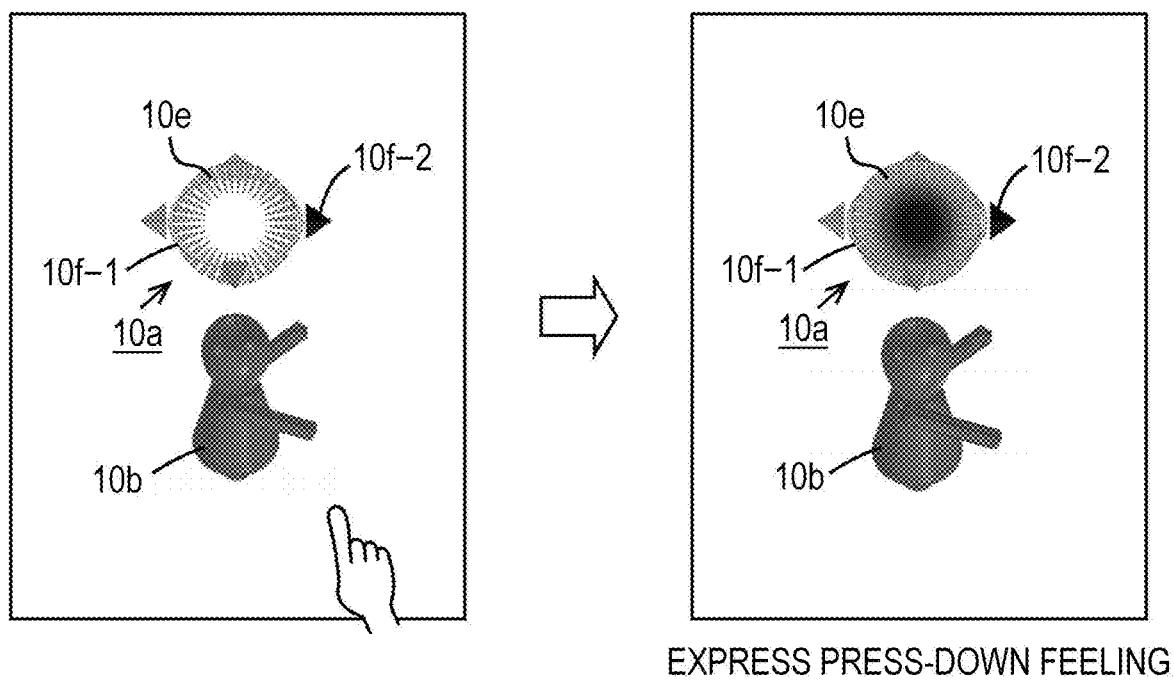
FIG. 23 shows another variation of the image of the functional state display part 10e.

FIG. 23 shows another variation of the image of the functional state display part 10e. For example, when the user presses the screen, in order to express the pressing to the user, as shown in FIG. 23, the color of the image of the functional state display part 10e may be changed (herein, the gradations in color) so that the user feels the pressing.

Use Variation of Virtual Controller

In the foregoing, it has been described that the virtual controller is used for controlling the shift of the manipulation target in the virtual space. However, other than the character shown above, the manipulation target in the virtual space may be an object which does not largely shift while the screen automatically scrolls. For example, a virtual firearm such as in a gun shooting game hardly moves. Here, for controlling the shooting direction, the virtual controller of the present invention can be used.

FIGS. 24A to 24E are a series of illustrations showing exemplary transition of the screen when the virtual controller of the present invention is used in a gun shooting game. As shown in FIGS. 24A and 24E, in the normal mode, it is assumed that the user executes attack with the desired direction and power based on the directional attribute 15f and the power attribute 15d obtained by a swipe. When the mode is switched to the search mode, as shown in FIG. 24B, any weak point is searched for, and weak points are displayed. Then, when the select mode is selected, as shown in FIG. 24C, a weak point can be selected by the direction of a flick. At this time, the directional attribute 15f is changed. Then, as shown in FIG. 24D, the user can execute attack in the normal mode in the direction indicated by the changed directional attribute 15f.

In this manner, the virtual controller of the present invention is not a controller whose use is limited to the case where a manipulation target shifts in the two- or three-dimensional virtual space. The virtual controller of the present invention can also be used as a virtual controller in the case where any manipulation target (in the example in FIGS. 24A to 24E, a firearm or a bullet) shifts on the screen. In such a case also, by the manipulation of the virtual controller, the directional attribute 15f and the power attribute 15d are changed, and the manipulation target attribute 16a such as the position information 16b, the speed information 16c, the direction information 16d, or the target information 16e of the firearm or the bullet is changed based on the directional attribute 15f and the power attribute 15d, to be displayed on the screen.

Additionally, the virtual controller can be used in various games or applications. The use of the virtual controller in any application other than a game has been described in the introduction of the present description. The virtual controller can be applied to an application that has any manipulation target.

With Two or More Virtual Controllers

In the above-described embodiment, one virtual controller has been shown. However, two or more virtual controllers may be displayed on the screen. In the following, a description will be given of the operation of the computer 1 with two or more virtual controllers being displayed.

Figure 25:
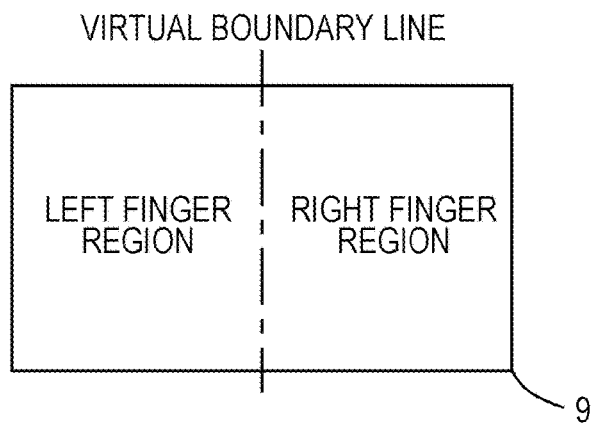
FIG. 25 is an illustration for explaining the principle when two virtual controllers are used.

FIG. 25 is an illustration for explaining the principle when two virtual controllers are used. In using two virtual controllers, the manipulation input part 9 is divided into a left finger region and a right finger region relative to a virtual boundary line, so that the manipulation detecting part 11 can recognize whether a manipulation is performed with a left finger or a right finger. That is, when a finger is brought into contact with the left finger region, the manipulation detecting part 11 recognizes that the manipulation is performed with a left finger, and the virtual controller attribute for a left-finger manipulation is controlled. When a finger is brought into contact with the right finger region, the manipulation detecting part 11 recognizes that the manipulation is performed with a right finger, and the virtual controller attribute for a right-finger manipulation is controlled. Thus, the two virtual controllers respectively for a left finger and a right finger can be controlled.

Note that, the dividing range in the manipulation input part is not limited to the example shown in FIG. 25. The dividing may be performed to obtain top and bottom regions, or may be performed diagonally. The dividing may be performed with any polygon or with any curve. So long as the manipulation input part is divided into two regions, the dividing may be performed in any manner. Further, the manipulation input part may be divided into three or more regions. In this case, three or more virtual controllers may be used. Further, as to the dividing of the manipulation input part, the present invention also includes the case where the manipulation input part is divided into two regions throughout the program. The present invention also includes the case where the manipulation input part is basically one region and divided into two or more regions as necessary.

Figure 26:
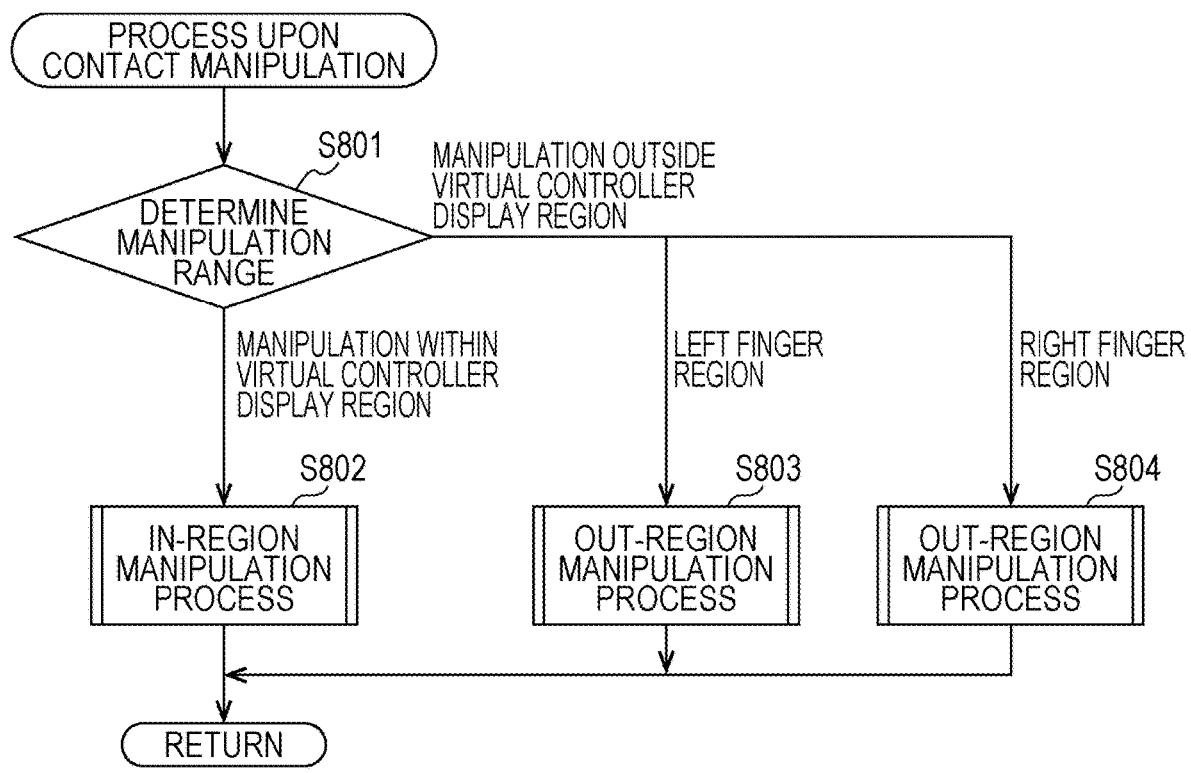
FIG. 26 is a flowchart showing a process upon a contact manipulation when two virtual controllers are used.

FIG. 26 is a flowchart showing the process upon a contact manipulation when two virtual controllers are used. In FIG. 26, the manipulation detecting part 11 determines the manipulation range (S801).

When the manipulation is performed within the display region of the virtual controller, out of the two virtual controllers, the in-region manipulation process is performed on the virtual controller with which the manipulation is executed (S802). The in-region manipulation process (S802) is similar to the operation in FIG. 7.

On the other hand, when the manipulation is performed outside the display region and in the left finger region, the out-region manipulation process is executed (S803); when the manipulation is performed in the right finger region, the out-region manipulation process is executed (S804). Both of the out-region manipulation processes are similar to the processes in FIGS. 8 and 9.

With three or more virtual controllers also, the out-region manipulation processes should be executed so as to respectively correspond to the regions.

FIGS. 27A to 27D are a series of illustrations showing an exemplary screen when two virtual controller images are used. In FIG. 27A, it is assumed that a left-finger virtual controller 10a-1 is switched to the search mode, and a right-finger virtual controller 10a-2 is switched to the normal mode. Thus, as shown in FIG. 27B, weak points are searched for and displayed, allowing the user to execute attack on the enemy character in the normal mode while avoiding attack with the user's right finger.

As shown in FIG. 27C, by switching the left-finger virtual controller 10a-1 to the select mode, while avoiding attack with the user's right finger, the user can select a weak point by performing a flick with the user's left finger and execute attack.

Further, as shown in FIG. 27D, by setting the right-finger virtual controller 10a-2 to the automatic attack mode, the user can automatically execute attack on a weak point.

Note that, the display positions of the left-finger virtual controller 10a-1 and the right-finger virtual controller 10a-2 are not necessarily separated on the left side and the right side, and may be displayed at any positions.

In this manner, by dividing the manipulation detecting part 11 into two or more regions, allotting the attributes of the virtual controller images to the regions, and the virtual controller attribute changing part 14 changing the attributes of any corresponding virtual controller images according to the manipulation of the user on the regions two or more different operations can be simultaneously performed using two or more virtual controller images.

The dividing the region also is not limited to a game. For example, in order for a plurality of users to manipulate one or more manipulation targets using a meeting table, a large screen display or the like, the virtual controller may be allotted to each of the user. In this case, the users may each manipulate one or more manipulation targets using the virtual controller. Usage other than a game may be as follows. For example, an image inside a factory or a shop, a CAD image or the like may be displayed on a display apparatus, and the users may respectively manipulate the allotted manipulation regions, thereby controlling the virtual controllers. In such a case, the present invention is applicable to an application with which the users carries out a conference or a meeting while manipulating the manipulation targets. As said before, note that such uses are merely examples.

Further, in the foregoing description, since the region is divided, some may misunderstand that every region on the screen is allotted to a certain region. However, the dividing the region as used herein is not limited to the case where the entire screen is divided into the regions where manipulations can be performed. The dividing the region includes the case where the dividing is carried out so that manipulations can be performed just part of the screen and the screen also includes a region where any manipulation cannot be performed. Therefore, without being limited to use of two or more regions, it goes without saying that the dividing the region of the present invention includes the case where just one region is used, or the case where allotment is carried out so that just part of the divided regions of the screen is the region where manipulations can be performed.

Variation Relating to Shift in Top-Bottom Direction in Virtual Space

In the above-described embodiment, in the horizontal/directional display part 10f, the horizontal display part 10f-1 is displayed to indicate the reference plane such as the horizontal plane, the ground or the like in the virtual space. Therefore, for example, when an operation for causing the manipulation target to jump is performed, the horizontal/directional display part 10f in the virtual controller merely displays the horizontal display part 10f-1 to become parallel to the reference plane such as the horizontal plane, the ground or the like. The height of the jump cannot be checked with the display content of the virtual controller. Note that, the jump action can be realized by, for example, accepting a shake during the operation from S202 to S209 in FIG. 5 when the shake is performed, or recognizing a tap in the recognizing the manipulation result in S509 in FIG. 8. However, the present invention is not limited thereto.

Figure 28:
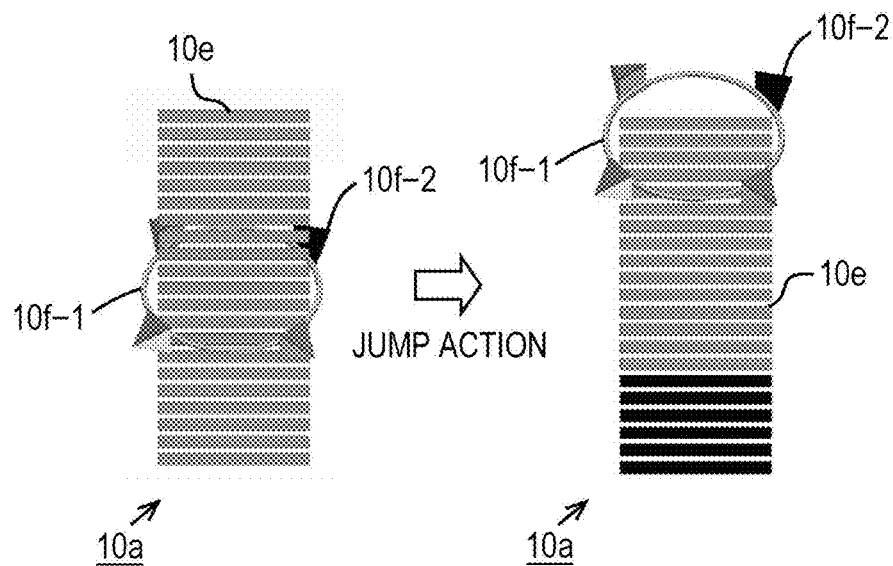
FIG. 28 shows an exemplary case where the height is indicated by changing the positional relationship between the functional state display part 10e and the horizontal/directional display part 10f.

In an embodiment where the display content of the virtual controller image is changed according to a jump action, as shown in FIG. 28, by changing the positional relationship between the functional state display part 10e and the horizontal/directional display part 10f, the height of a jump can be visually recognized. Here, the positional relationship between the functional state display part 10e and the horizontal/directional display part 10f becomes a fifth image indicating the height. Note that, here, the horizontal attribute 15e includes the height attribute. According to the height attribute, the display image generating part 13 generates the virtual controller image (the fifth image) in which the height of the horizontal/directional display part 10f is adjusted.

Further, in the horizontal attribute, by previously defining an attribute relating to the elevation/depression angle of the horizontal display part 10f-1 (the elevation/depression angle attribute), and the display image generating part 13 generating the virtual controller image (a sixth image) so that the elevation/depression angle of the horizontal/directional display part 10f changes based on the elevation/depression angle attribute of the horizontal attribute, the direction of the movement in the top-bottom direction of the manipulation target can be expressed. For example, ascending or descending of a plane can be expressed by such an elevation/depression angle.

Figure 29:
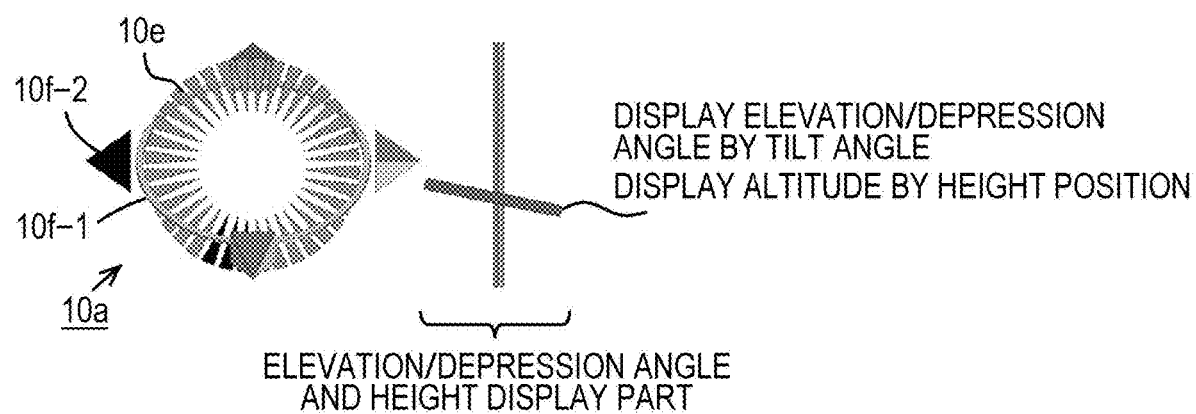
FIG. 29 shows an exemplary elevation/depression angle and height display part.

Further, as shown in FIG. 29, in order to indicate the elevation/depression angle and the altitude, the virtual controller image may further include an elevation/depression angle and height display part (the sixth image), so as to display the elevation/depression angle and the altitude.

Variation of Image

In the above-described embodiment, while the first to sixth images have been proposed, other image may be displayed on the virtual controller image. For example, as a seventh image, an image showing the state of the manipulation target (for example in a game program, the state of manipulation penalty when poisoned or paralyzed, the invincible state, or the state of being raised in level during a limited time) may be included in the virtual controller age.

In addition, the virtual controller image may include any image other the above-described example. The first to seventh images do not limit the present invention.

Note that, the present invention may be any information processing apparatus that executes the above-described program, such as a personal computer, a workstation, a smartphone, a tablet terminal, a digital audio player, or any other computer apparatus.

In the foregoing, the present invention has been described in detail. However, the foregoing description is merely of an illustrative nature, and not intended to limit the scope of the present invention. It goes without saying that various improvements or modifications can be made within the spirit of the present invention. The constituents of the present invention disclosed in the present specification each serve as an independent inventive aspect. An inventive aspect realized by a combination of the constituents is also included in the present invention.

INDUSTRIAL APPLICABILITY

The present invention is industrially applicable to a program.

REFERENCE SIGNS LIST

1 Computer
2 Display apparatus
3 Input part
4 Storage part
4a Setting information
4b Virtual controller image data
4c Manipulation target image data
4d Background image data
4e Displayed object image data
5 Communication part
6 CPU
7 ROM
8 RAM
9 Manipulation input part
10 Display part
10a Virtual controller image
10b Manipulation target age
10c Background image
10d Displayed object image
10e Functional state display part
10f Horizontal/directional display part
10f-1 Horizontal display part
10f-2 Directional display part
12 Control part
13 Display image generating part
14 Virtual controller attribute changing part
11 Manipulation detecting part
12 Control part
13 Display image generating part
15 Virtual controller attribute storage part
15a Functional state display part attribute
15b Horizontal/directional display part attribute
15c Manipulation mode attribute
15d Power attribute
15e Horizontal attribute
15f Directional attribute
15g Precondition setting information
15h Manipulation power information
15i Display position information
16 Manipulation target attribute storage part
16a Manipulation target attribute
16b Position information
16c Speed information
16d Direction information
16e Target information
17 Viewpoint attribute storage part
17a Viewpoint attribute

What is claimed is:

1. A non-transitory storage medium storing a computer-readable information processing program executed by a computer, including a virtual controller attribute storage for storing information on an attribute of a virtual controller image on a display apparatus; and a manipulation target attribute storage for storing information on an attribute of one or more displayed manipulation targets on the display apparatus, the computer being connected to or including the display apparatus including a manipulation input part accepting one of a contact manipulation and a proximity manipulation, and causing the computer executing the information processing program to function as:

virtual controller attribute changing module for changing the attribute of the virtual controller image having been stored in the virtual controller attribute storage according to a manipulation of a user performed on the manipulation input part; and display image generating module for generating the virtual controller image based on the attribute of the virtual controller image changed by the virtual controller attribute changing module, changing the attribute of the one or more manipulation targets having been stored in the manipulation target attribute storage based on the attribute of the virtual controller image changed by the virtual controller attribute changing module, and generating an image of the one or more manipulation targets based on the changed attribute of the one or more manipulation targets such that the one or more manipulation targets shift linked to the attribute of the virtual controller image.

2. The non-transitory storage medium according to claim 1, wherein
the virtual controller image includes at least one of a first image indicating power and a second image indicating a direction.

3. The non-transitory storage medium according to claim 2, wherein
the first image represents a shift speed of the one or more manipulation targets, and
the second image represents a shift direction of the one or more manipulation targets.

4. The non-transitory storage medium according to claim 3, wherein
the virtual controller image includes at least one of a third image indicating a manipulation mode, a fourth image indicating a reference plane, a fifth image indicating a height, a sixth image indicating an elevation/depression angle, and a seventh image indicating a state of the one or more manipulation targets.

5. The non-transitory storage medium according to claim 1, wherein the computer is controlled so that, when a manipulation is performed by the user on the manipulation input part, the virtual controller attribute changing module changes an attribute relating to the direction in the virtual controller image based on a direction of the manipulation performed by the user.

6. The non-transitory storage medium according to claim 1, wherein
the computer is controlled so that, while a drag is performed as the manipulation performed by the user on the manipulation input part, the virtual controller attribute changing module changes an attribute relating to a direction in the virtual controller image according to a movement of the drag.

7. The non-transitory storage medium according to claim 1, wherein
the computer is controlled so that, when a manipulation is performed by the user on the manipulation input part, the virtual controller attribute changing module changes an attribute relating to a power in the virtual controller image based on a distance traveled by the manipulation performed by the user.

8. The non-transitory storage medium according to claim 1, wherein
the computer is controlled so that, when a swipe is performed as the manipulation performed by the user on the manipulation input part, the virtual controller attribute changing module changes an attribute relating to a power in the virtual controller image based on a distance traveled by the swipe.

9. The non-transitory storage medium according to claim 1, wherein
the computer is controlled so that, when a flick is performed as the manipulation performed by the user on the manipulation input part, the virtual controller attribute changing module changes an attribute relating to a power in the virtual controller image based on the flick.

10. The non-transitory storage medium according to claim 1, wherein
the computer is controlled so that, when a tap is performed as the manipulation performed by the user on the manipulation input part, the one or more manipulation targets perform a predetermined operation.

11. The non-transitory storage medium according to claim 1, wherein
the computer is controlled so that, when a tap is performed as the manipulation performed by the user on the manipulation input part, the virtual controller attribute changing module changes an attribute relating to a power in the virtual controller image to stop the one or more manipulation targets.

12. The non-transitory storage medium according to claim 1, wherein
the computer is controlled so that, when an instruction to change a viewpoint is issued by the manipulation performed by the user on the manipulation input part, the display image generating module generates an image in which the viewpoint is changed.

13. The non-transitory storage medium according to claim 1, wherein
the computer is controlled so that, when a manipulation performed by the user on the manipulation input part detects an instruction to pick up and shift the one or more manipulation targets, the display image generating module shifts the one or more manipulation targets.

14. The non-transitory storage medium according to claim 1, wherein
the computer is controlled so that, during an absence of the manipulation performed by the user on the manipulation input part, the virtual controller attribute changing module automatically changes an attribute relating to a power of the virtual controller image according to a predetermined rule.

15. The non-transitory storage medium according to claim 1, wherein
the computer is controlled so that, while the user is performing one of the contact manipulation and the proximity manipulation with the manipulation input part, the virtual controller attribute changing module fixes an attribute relating to a power in the virtual controller image.

16. The non-transitory storage medium according to claim 1, wherein
the computer is controlled so that, a change rate of an attribute relating to a power of the virtual controller image for the manipulation performed by the user on the manipulation input part is adjustable.

17. The non-transitory storage medium according to claim 1, wherein
the computer is controlled so that, when an instruction to change an altitude of the one or more manipulation targets is issued by the manipulation performed by the user on the manipulation, the display image generating module generates an image in which the altitude of the one or more manipulation targets is changed.

18. The non-transitory storage medium according to claim 1, wherein
the computer is controlled so that, when an instruction to change an elevation/depression angle of the one or more manipulation targets is issued by the manipulation performed by the user on the manipulation input part, the display image generating module generates an image in which the elevation/depression angle of the one or more manipulation targets is changed.

19. The non-transitory storage medium according to claim 1, wherein
the computer is controlled so that a manipulation detecting part is divided into at least two regions, attributes of the virtual controller image are allotted respectively to the regions, and a virtual controller attribute changing part changes corresponding ones of the attributes of the virtual controller image according to the manipulation performed by the user on one of the regions.

20. An information processing apparatus connected to or including a display apparatus including a manipulation input part accepting one of a contact manipulation and a proximity manipulation, the information processing apparatus comprising:
a virtual controller attribute storage for storing information on an attribute of a virtual controller image on the display apparatus;
a manipulation target attribute storage for storing information on an attribute of one or more displayed manipulation targets on the display apparatus;
virtual controller attribute changing module for changing the attribute of the virtual controller image having been stored in the virtual controller attribute storage according to a manipulation of a user performed on the manipulation input part; and
display image generating module for generating the virtual controller image based on an attribute of the virtual controller image changed by the virtual controller attribute changing module, changing the attribute of the one or more manipulation targets having been stored in the manipulation target attribute storage based on the attribute of the virtual controller image changed by the virtual controller attribute changing module, and generating an image of the one or more manipulation targets based on the changed attribute of the one or more manipulation targets such that the one or more manipulation targets shift linked to the attribute of the virtual controller image.

* * * * *